US011604440B2

(12) United States Patent
Nakagawa

(10) Patent No.: US 11,604,440 B2
(45) Date of Patent: *Mar. 14, 2023

(54) CONTROL SWITCHING DEVICE FOR ABNORMALITY PREVENTION IN MULTIPLE TERMINALS

(71) Applicant: HITACHI, LTD., Tokyo (JP)

(72) Inventor: Shinji Nakagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 250 days.

This patent is subject to a terminal disclaimer.

(21) Appl. No.: 16/495,040

(22) PCT Filed: Mar. 29, 2017

(86) PCT No.: PCT/JP2017/013106
§ 371 (c)(1),
(2) Date: Sep. 17, 2019

(87) PCT Pub. No.: WO2018/179191
PCT Pub. Date: Oct. 4, 2018

(65) Prior Publication Data
US 2020/0026246 A1    Jan. 23, 2020

(51) Int. Cl.
G05B 9/03       (2006.01)
G05B 13/02      (2006.01)

(52) U.S. Cl.
CPC ........... G05B 9/03 (2013.01); G05B 13/0265 (2013.01); *G05B 2219/2642* (2013.01)

(58) Field of Classification Search
CPC .............................. G05B 9/03; G05B 13/0265
(Continued)

(56) References Cited

U.S. PATENT DOCUMENTS 4,562,528 A * 12/1985 Baba ..................... G05B 9/03
                                                       700/4
5,268,834 A * 12/1993 Sanner ................ G05B 13/027
                                                      706/23
(Continued)

FOREIGN PATENT DOCUMENTS

JP         04-107604 A      4/1992
JP         05-279980 A     10/1993
(Continued)

OTHER PUBLICATIONS

Shinji Hayashi, Machine Translation of (JPH05279980A) (Year: 1993).*

(Continued)

*Primary Examiner* — Md Azad
(74) *Attorney, Agent, or Firm* — Volpe Koenig

(57) ABSTRACT

There is provided a control device that prevents the occurrence of an abnormality in control using artificial intelligence in the case where an abnormality occurs in another terminal that performs the control using the artificial intelligence. A control means (a first control unit) performs the control using artificial intelligence. The control means (second control unit) performs control different from the artificial intelligence. A control switching unit (a switching determination means, a switch) is configured to, when another terminal having the control means (the first control unit) is normal, cause the own control means (the first control unit) to perform the control using artificial intelligence, and when an abnormality occurs in another terminal having the control means (the first control unit), cause the control means (the second control unit) to perform the control different from artificial intelligence.

14 Claims, 26 Drawing Sheets

(58) Field of Classification Search
USPC .......................................................... 700/28
See application file for complete search history.

(56) References Cited

U.S. PATENT DOCUMENTS

| | | | | |
|---|---|---|---|---|
| 5,479,119 | A * | 12/1995 | Tice | H03G 11/00 361/88 |
| 9,571,819 | B1 * | 2/2017 | Barron | H04N 13/239 |
| 2006/0048227 | A1 * | 3/2006 | Ohta | G06F 21/554 726/22 |
| 2007/0067047 | A1 * | 3/2007 | Kitagawa | G05B 15/00 700/3 |
| 2009/0040934 | A1 * | 2/2009 | Matsubara | G05B 23/0237 370/242 |
| 2009/0062976 | A1 * | 3/2009 | Koski | F16H 61/12 701/39 |
| 2009/0172477 | A1 * | 7/2009 | Mukaigawa | G05B 23/0235 714/47.2 |
| 2009/0281639 | A1 * | 11/2009 | McNab | G05B 11/42 700/7 |
| 2009/0309360 | A1 * | 12/2009 | Jurkat | G05B 9/03 290/44 |
| 2010/0083076 | A1 * | 4/2010 | Ushiyama | G06F 1/14 714/E11.001 |
| 2010/0191697 | A1 * | 7/2010 | Fukumoto | G06N 5/04 706/54 |
| 2011/0251701 | A1 * | 10/2011 | Jung | G05B 19/18 700/42 |
| 2012/0005743 | A1 * | 1/2012 | Kitazawa | H04L 63/1425 726/13 |
| 2013/0086413 | A1 * | 4/2013 | Kaliannan | H04L 69/40 714/4.1 |
| 2013/0111259 | A1 * | 5/2013 | Umezuki | G06F 11/2033 714/4.2 |
| 2013/0200990 | A1 * | 8/2013 | Yamada | G05B 9/03 340/3.44 |
| 2015/0196002 | A1 * | 7/2015 | Friesth | C12M 41/48 47/62 R |
| 2016/0004241 | A1 * | 1/2016 | Yoshiike | G05B 9/03 700/2 |
| 2016/0017574 | A1 * | 1/2016 | Adachi | E02F 9/267 701/31.4 |
| 2016/0142509 | A1 * | 5/2016 | Shen | G06F 21/305 726/19 |
| 2016/0247115 | A1 * | 8/2016 | Pons | G06K 7/10376 |
| 2019/0087736 | A1 * | 3/2019 | Kita | G06F 3/011 |
| 2019/0362219 | A1 * | 11/2019 | Scheffler | G06N 3/04 |

FOREIGN PATENT DOCUMENTS

| | | | |
|---|---|---|---|
| JP | 05-297904 A | | 11/1993 |
| JP | 2000-044063 A | | 2/2000 |
| JP | 2002-049405 A | | 2/2002 |
| JP | 2011128063 A | * | 6/2011 |
| KR | 2003056108 A | * | 7/2003 |

OTHER PUBLICATIONS

Kazushige Fujihira, Machine Translation of (JPH05297904A) (Year: 1993).*

Zhang, Yunpeng; Duan, Haibin; A directional control system for UCAV automatic takeoff roll, Aircraft Engineering and Aerospace Technology 85.1: 48-61. Emerald Group Publishing Limited. (Year: 2013).*

International Search Report dated Jul. 4, 2017 for the PCT International Application No. PCT/JP2017/013106.

* cited by examiner

<FIRST TO SIXTH EMBODIMENTS>

<FIRST TO NINTH EMBODIMENTS>

EX) MODELING OF CONTROL TARGET IN NEURAL NETWORK (DEEP LEARNING) IS PERFORMED, AND PREDICTION CONTROL AND INVERSE MODEL CONTROL ARE PERFORMED.

<FIRST TO THIRD AND FIFTH TO NINTH EMBODIMENTS>

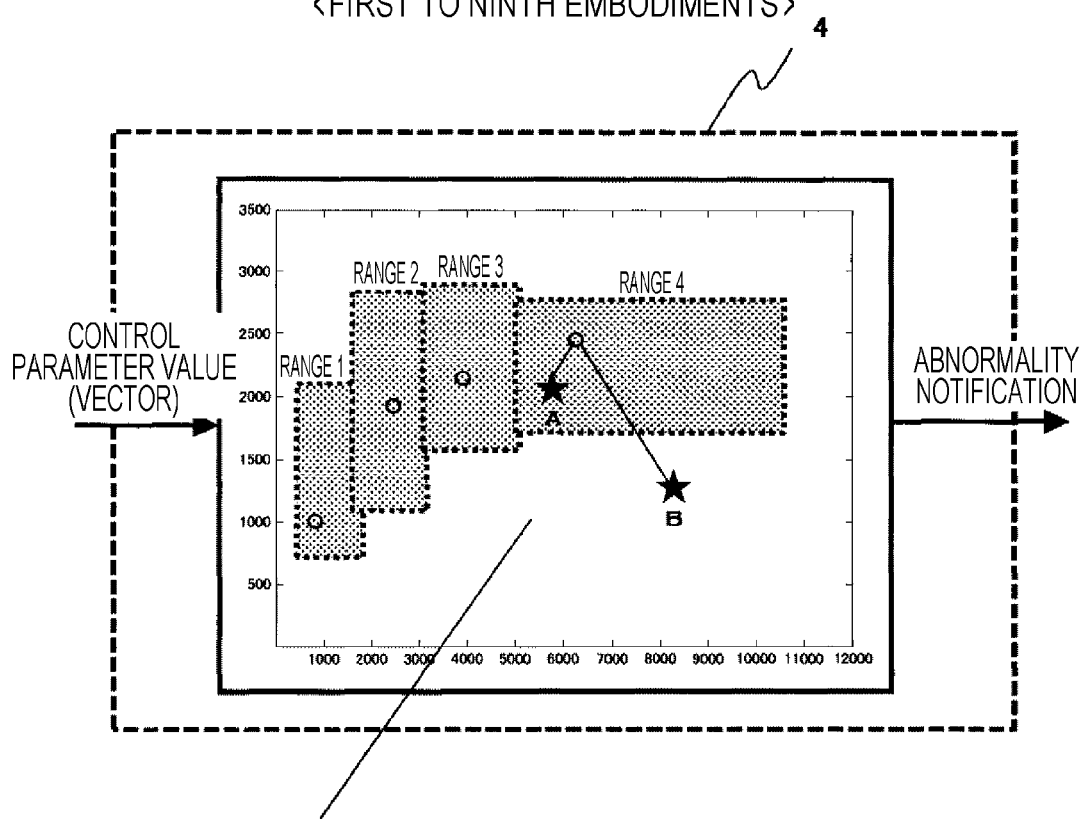

FIG. 7
⟨FIRST TO NINTH EMBODIMENTS⟩

- CENTER VECTOR CLOSEST TO NEW DATA (VECTOR) IS SPECIFIED IN SENSE OF L2 DISTANCE.
- IT IS DETERMINED THAT CENTER VECTOR IS NORMAL WHEN NEW DATA (VECTOR) EXISTS IN RANGE CORRESPONDING TO SPECIFIED CENTER VECTOR.
  IT IS DETERMINED THAT CENTER VECTOR IS ABNORMAL WHEN STATE IN WHICH NEW DATA (VECTOR) DOES NOT EXIST IN RANGE CORRESPONDING TO SPECIFIED CENTER VECTOR LASTS FOR PREDETERMINED TIME.

⟨FIRST TO SEVENTH EMBODIMENTS⟩

*CONDITION A: CONTROL PARAMETER VALUE IS IN PREDETERMINED RANGE.
*CONDITION B: AMOUNT OF CHANGE IN CONTROL PARAMETER VALUE IS IN PREDETERMINED RANGE.

⟨FIRST TO FOURTH EMBODIMENTS⟩

<THIRD EMBODIMENT>

<FOURTH EMBODIMENT>

*MANUAL CONTROL REFERS TO CONTROL BY DRIVER USING ACCELERATOR, BRAKE, AND STEERING WHEEL.

<SIXTH EMBODIMENT>

<EIGHTH EMBODIMENT>

<EIGHTH EMBODIMENT>

<EIGHTH EMBODIMENT>

<NINTH EMBODIMENT>

<NINTH EMBODIMENT>

<NINTH EMBODIMENT>

<NINTH EMBODIMENT>

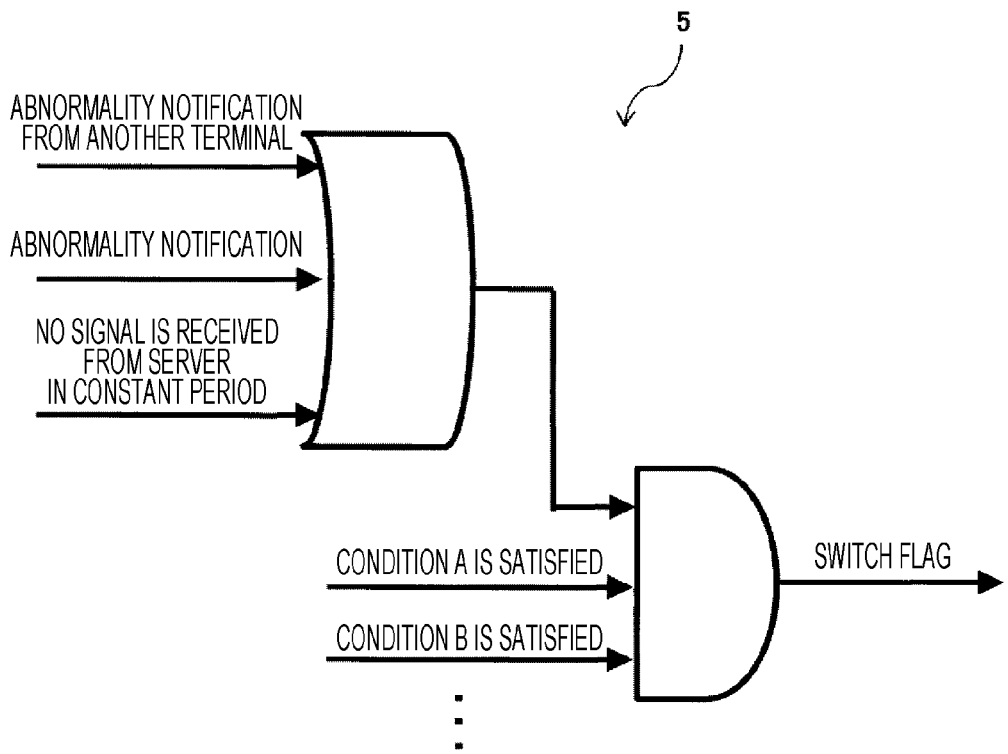

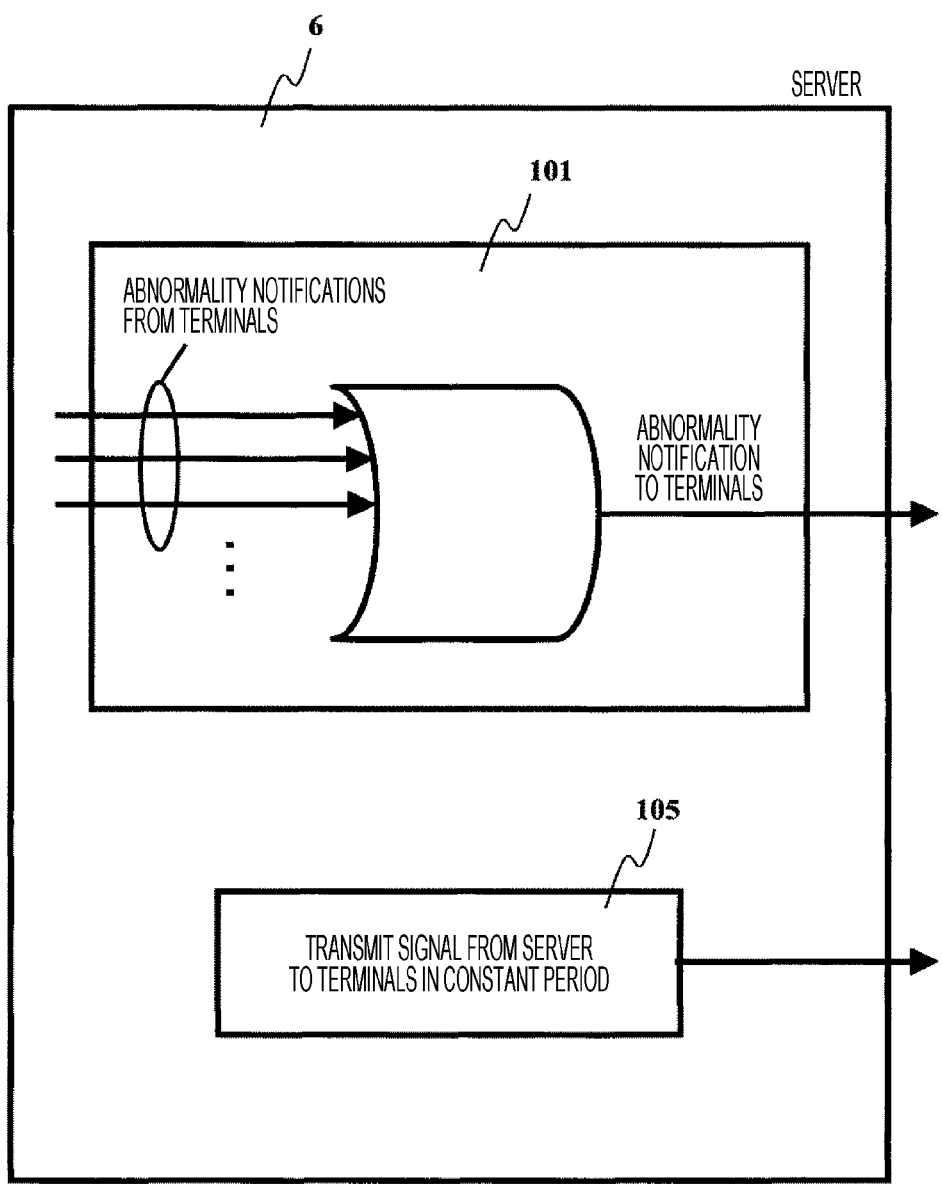

CONTROL SWITCHING DEVICE FOR ABNORMALITY PREVENTION IN MULTIPLE TERMINALS

TECHNICAL FIELD

The present invention relates to a control device and a control system.

BACKGROUND ART

There is JP H05-279980 A (PTL 1) that describes a background art of this technical field. This literature describes "providing the operation mode switching means for switching between the automatic operation mode and the manual operation mode makes it possible to, even if a failure occurs in the image information processing system or the neural network for actual lines, immediately switch the operation mode to the manual operation mode so that operations can be continued. In addition, it is possible to switch to the manual operation mode, take input/output data at that time into the data storage means for learning and evaluation, make the neural network for learning and evaluation learn using this data, and transfer the connection weights as learning results to the neural network for real lines. This achieves automatic control as if a skilled operator performed the control" (refer to [Actions]).

There is also JP H05-297904 A (PTL 2) that describes a background art of this technical field. This literature describes "The control device, having a plurality of control methods performed by a PI control device, a fuzzy control device, and a neuro control device, stores in advance the relationships between the state of a control target and the suitability of the control methods performed by the control devices in that state, includes a control method switching device that determines the suitability of the control methods in the state of the control target at each point in time based on the stored relationships, outputs and displays the optimality or suitability of the control methods or the state of the control target according to the state of the control target that is input to the control method switching device at each point in time, the normal or abnormal state of the control devices, and the normal or abnormal state of the input information to the control devices, and selects the optimum control method and switches to the optimum control method" (refer to [Configuration]).

CITATION LIST

Patent Literatures

PTL 1: JP H05-279980 A
PTL 2: JP H05-297904 A

SUMMARY OF INVENTION

Technical Problem

However, each of the related arts (described in PTL 1 and PTL 2) relates to a control method for the case where an abnormality occurs in a single control system using artificial intelligence such as a neural network or fuzzy control, not to a control method for the case where an abnormality occurs in a plurality of control systems using artificial intelligence.

An object of the present invention is to provide a control device and the like that can prevent the occurrence of an abnormality in control using artificial intelligence in the case where an abnormality occurs in another terminal that performs control using artificial intelligence.

Solution to Problem

To achieve the above object, the present invention includes: a first control unit that performs control using artificial intelligence; a second control unit that performs control different from the artificial intelligence; and a control switching unit that, when another terminal having the first control unit is normal, causes the first control unit to perform the control using the artificial intelligence, and when an abnormality occurs in the other terminal having the first control unit, causes the second control unit to perform the control different from the artificial intelligence.

Advantageous Effects of Invention

According to the present invention, it is possible to prevent the occurrence of an abnormality in control using artificial intelligence in the case where an abnormality occurs in another terminal that performs the control using the artificial intelligence. Other issues, configurations, and advantageous effects will be clarified in the following description of embodiments.

BRIEF DESCRIPTION OF DRAWINGS

FIG. 7 is a diagram illustrating processing by an abnormality detection means according to the first to ninth embodiments.

FIG. 26 is a diagram illustrating processing by a control switching determination means according to the ninth embodiment.

FIG. 27 is a diagram illustrating processing by a server according to the ninth embodiment.

DESCRIPTION OF EMBODIMENTS

Hereinafter, a configuration and operations of a control system including a terminal (control device) according to first to ninth embodiments of the present invention will be described with reference to the drawings. The terminal controls machines such as robots, autonomous vehicles, and drones (air vehicles). Identical reference signs represent identical components in all the drawings.

First Embodiment

In the present embodiment, each of a plurality of terminals includes: a control means using artificial intelligence (machine learning); a control means using proportional integral derivative (PID) control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to the PID control.

When a state in which the value of at least one parameter of the control using artificial intelligence (machine learning) is not within a predetermined range lasts for a predetermined time, it is determined that there is an abnormality.

In addition, the control system is composed of a server and terminals, and when an abnormality occurs in the control means using artificial intelligence (machine learning) in at least one of the plurality of terminals, a communication means notifies via the server the abnormality in the control means using artificial intelligence (machine learning) to the terminals without an abnormality among the plurality of terminals.

When an abnormality occurs in one terminal, the control is switched in the order in which a predetermined switching condition is satisfied in the terminals among the other terminals without an abnormality. The predetermined switching conditions will be described later with reference to FIG. 8 and others.

The control system is also a device that controls a plurality of robots.

Figure 1:
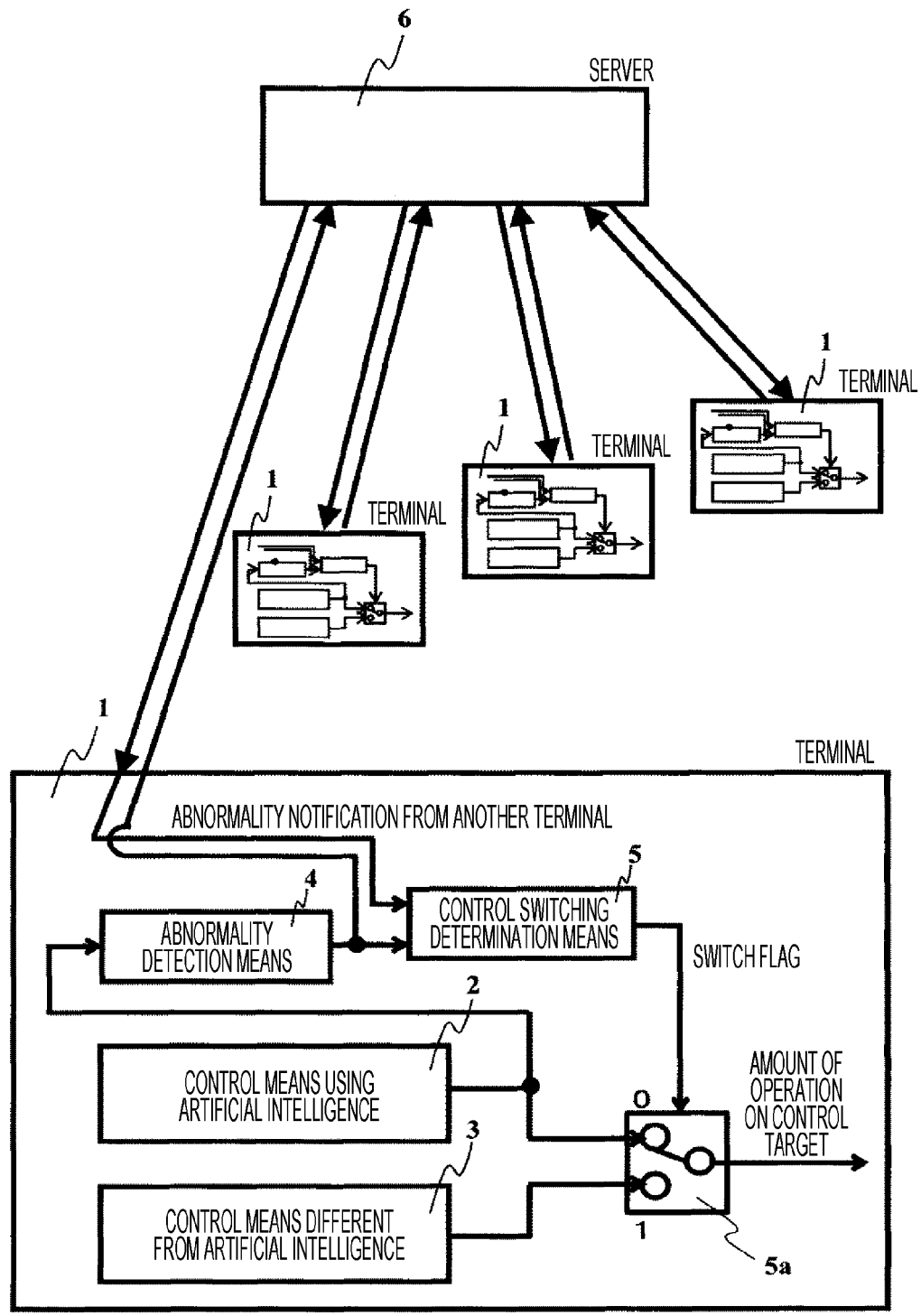
FIG. 1 is an overall view of a control system according to first to sixth embodiments.

FIG. 1 is a diagram illustrating the entire control system. A plurality of terminals 1 transmits and receives information via a server 6. When an abnormality occurs in one of the terminals 1, the occurrence of the abnormality is notified to the other terminals via the server 6. With the intervention of the server 6, for example, it is easy to secure information security. Each of the terminals 1 includes a control means 2 using artificial intelligence (machine learning) and a control means 3 using PID control different from the artificial intelligence. An abnormality detection means 4 detects an abnormality in the control means using artificial intelligence (machine learning). A control switching determination means 5 calculates a switch flag for switching control based on the detection result from the abnormality detection means 4 and the notification of an abnormality from another terminal.

In other words, the control means 2 (first control unit) performs control using artificial intelligence. The control means 3 (second control unit) performs control different from the artificial intelligence.

Figure 2:
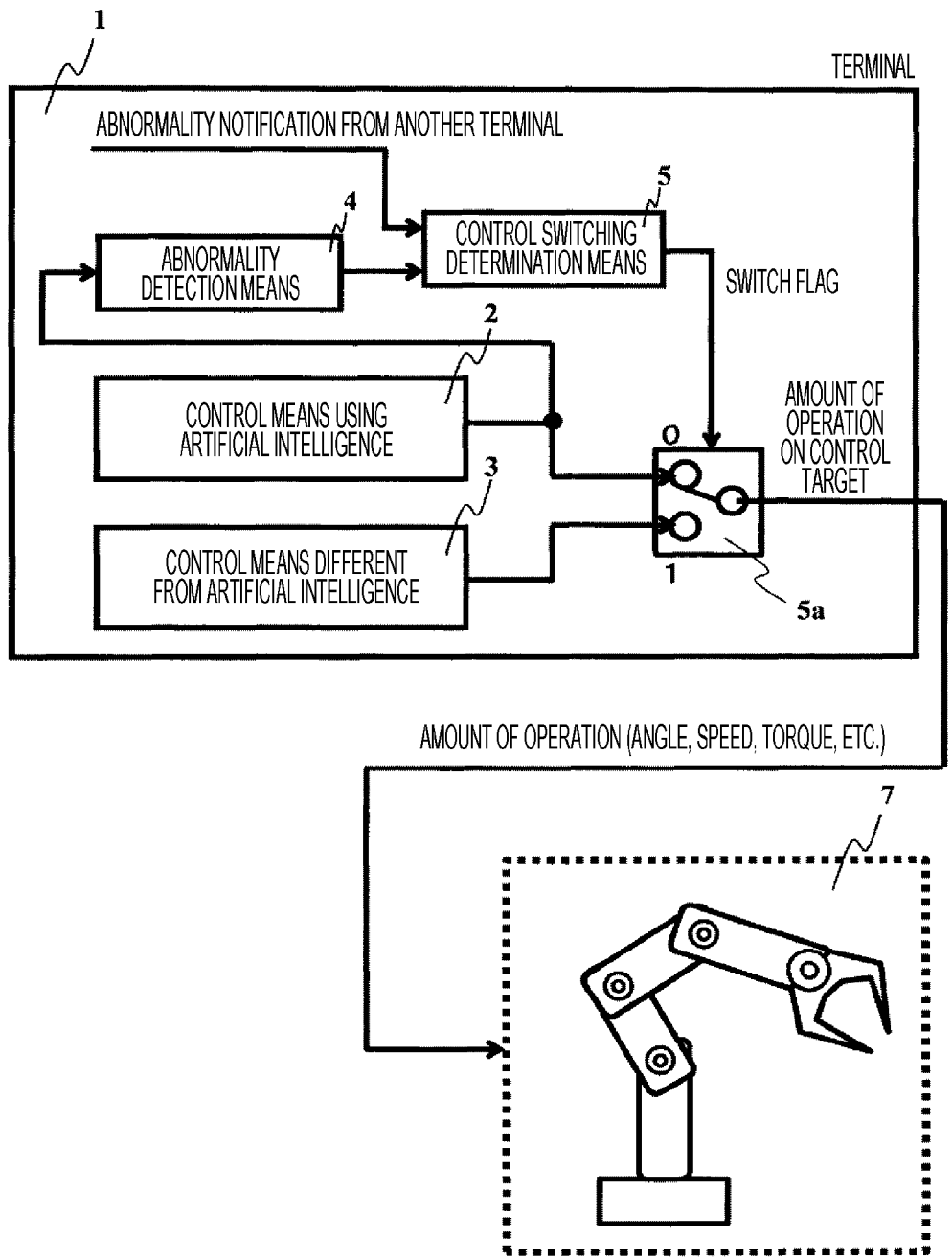
FIG. 2 is a diagram illustrating a terminal (control device) and a control target according to the first and fifth to seventh embodiments.

FIG. 2 illustrates a robot 7 in a production line controlled by the terminal 1 and the server 6. The control means 2 using artificial intelligence (machine learning) or the control means 3 using the PID control different from the artificial intelligence calculate operation amounts for controlling the robot 7 (for example, target angle, target speed, target torque, and others).

Figure 3:
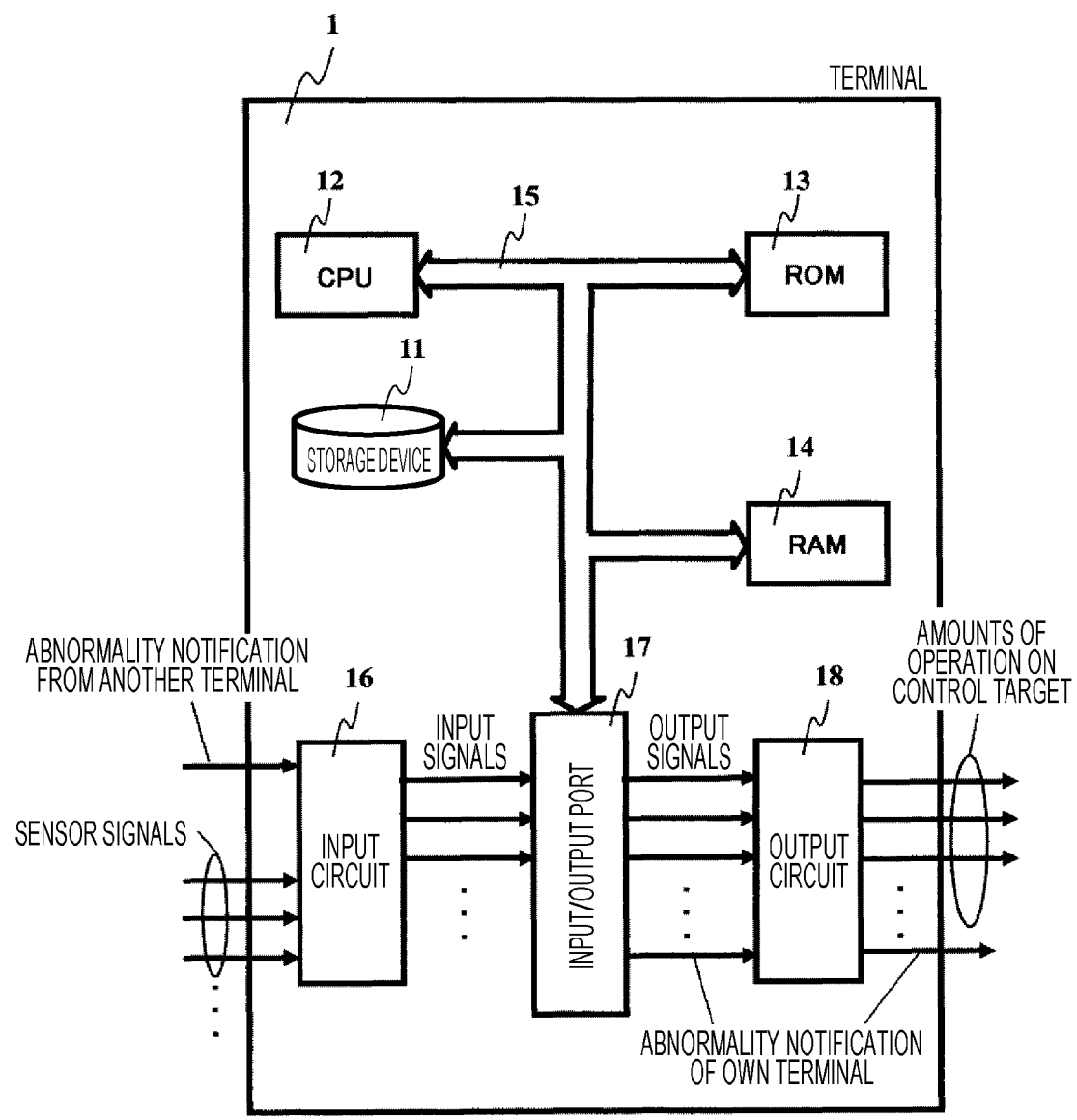
FIG. 3 is a system configuration diagram of a terminal (control device) according to the first to fifth and eighth embodiments.

FIG. 3 is a system configuration diagram of the terminal 1. The terminal 1 is provided with an input circuit 16 that processes signals from the outside. The signals from the outside here may be, for example, signals or the like from sensors installed in the terminal. These signals from the outside become input signals through the input circuit 16 and are sent to an input/output port 17. Each input information sent to the input/output port is written to a random access memory (RAM) 14 through a data bus 15. Otherwise, the input information is stored in a storage device 11.

For example, an input circuit 16 (reception unit) receives an abnormality notification indicating an abnormality in another terminal 1 having the control means 2 (first control unit) using artificial intelligence.

Processing described later is written in a read only memory (ROM) 13 or the storage device 11, and is executed by a central processing unit (CPU) 12. At that time, the values written in the RAM 14 or the storage device 11 are appropriately used to perform calculations. Among the calculation results, information (values) to be sent to the outside is sent to the input/output port 17 through the data bus 15, and sent to an output circuit 18 as output signals. The output signals are output to the outside from the output circuit 18. The signals to the outside here refer to actuator signals and the like for causing the control target to move as desired.

For example, when it is determined that the control means 2 (first control unit) using artificial intelligence is abnormal, an output circuit 18 (transmission unit) transmits an abnormality notification of the terminal 1. As a result, it is possible to notify the other terminals 1 of the possibility of an abnormality in the control using artificial intelligence.

Figure 4:
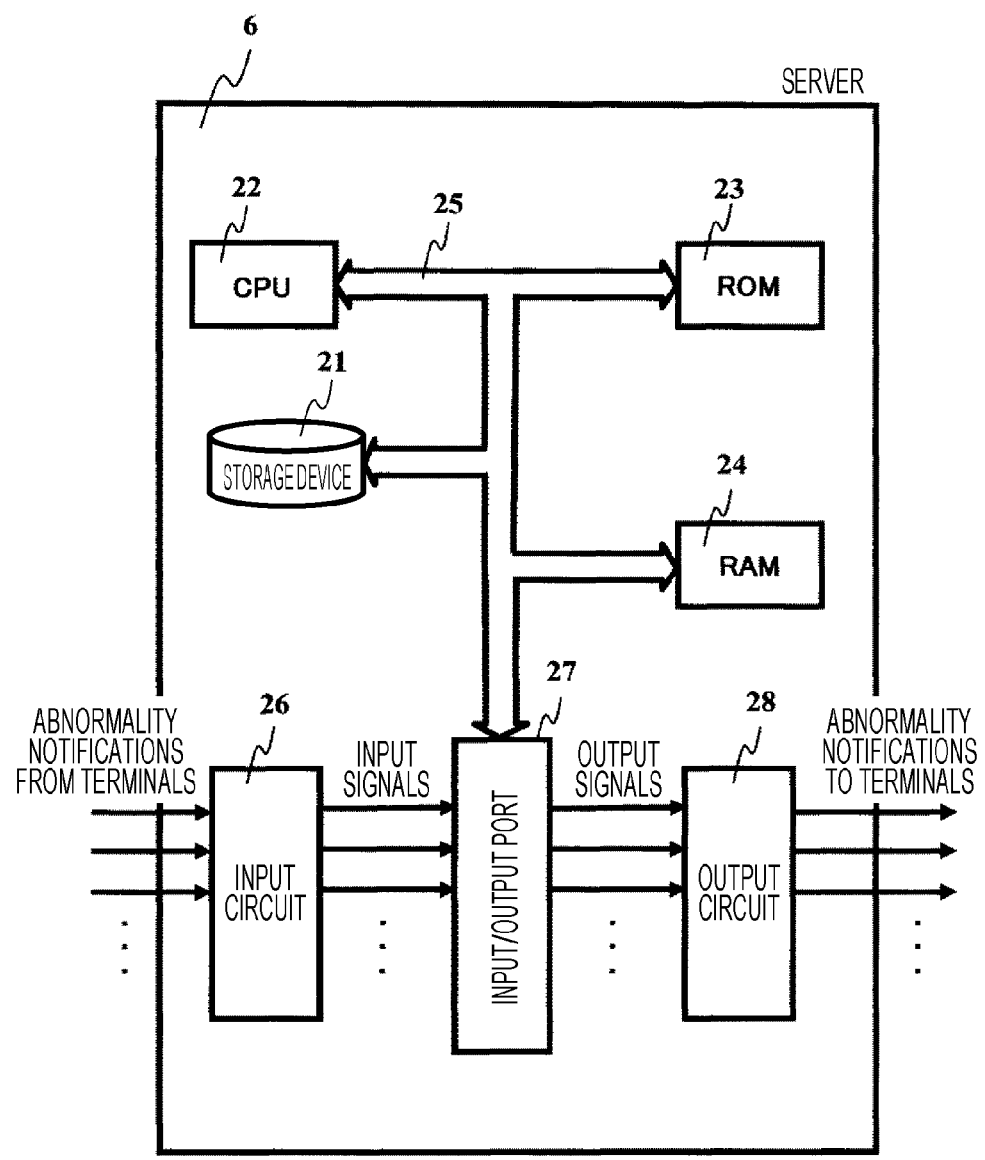
FIG. 4 is a system configuration diagram of a server according to the first to fifth and eighth embodiments.

FIG. 4 is a system configuration diagram of the server 6. The server 6 is provided with an input circuit 26 to process signals from the outside. The signals from the outside here refer to abnormality notifications from the terminals. The signals from the outside become input signals through the input circuit 26 and are sent to an input/output port 27. The input information sent to the input/output port is written to a RAM 24 through a data bus 25. Otherwise, the input information is stored in a storage device 21.

Processing described later is written in a ROM 23 or the storage device 21 and is executed by a CPU 22. At that time, the values written in the RAM 24 or the storage device 21 are appropriately used to perform calculations. Among the calculation results, information (values) to be sent to the outside is sent to the input/output port 27 through the data bus 25, and sent to an output circuit 28 as output signals. The output signals are output to the outside from the output circuit 28. The signals to the outside here are abnormal notifications to each terminal, and are sent to the plurality of terminals 1. The details of each of the processes will be described below.

<Control Means Using Artificial Intelligence (FIG. 5)>

Figure 5:
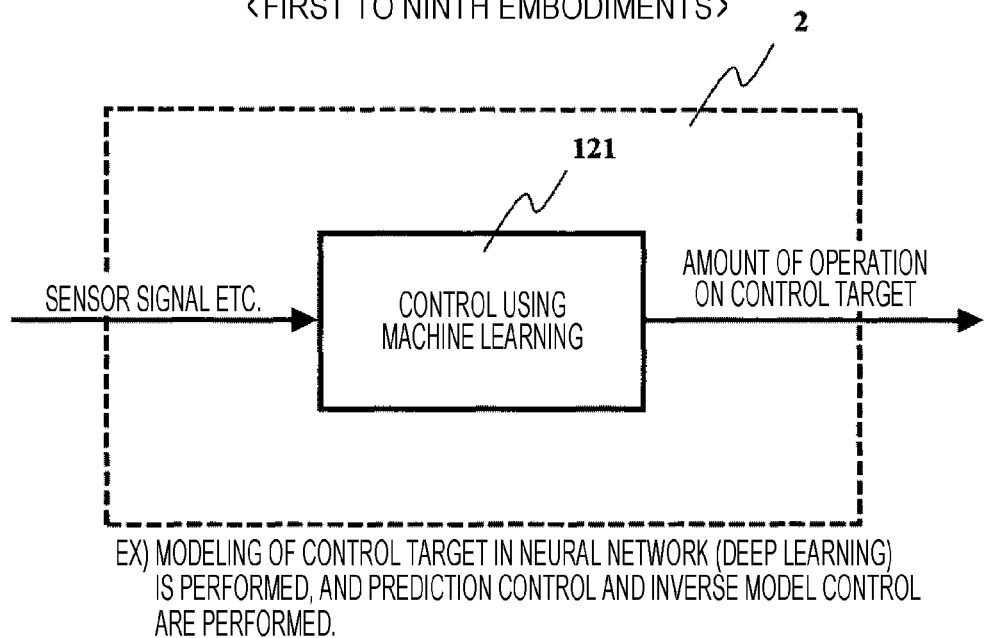
FIG. 5 is a diagram illustrating processing by a control means using artificial intelligence according to the first to ninth embodiments.

In this process, the amount of an operation to be performed on a control target by a control using artificial intelligence (machine learning) is calculated. FIG. 5 specifically illustrates the process.

The amount of an operation on a control target (the amount of an operation for controlling the robot 7 in the present embodiment) is calculated by a control 121 using machine learning from a sensor signal or the like.

The control means 2 (the first control unit) using artificial intelligence learns a control parameter value indicating a parameter of a function to determine the amount of an operation (output value) of the control using artificial intelligence from a sensor signal or the like (input value), and calculates the amount of an operation based on the sensor signal or the like and the learned control parameter value. The control parameter value learned by the control means 2 using artificial intelligence is stored, for example, in the storage device 11 (storage unit). Thereby, control parameters can be learned autonomously.

The control using machine learning will not be described in detail here because there are many known techniques thereof. For example, modeling of a control target may be performed by a neural network (deep learning), and a predictive control, an inverse model control, or the like may be performed.

<Control Means Different from Artificial Intelligence (FIG. 6)>

Figure 6:
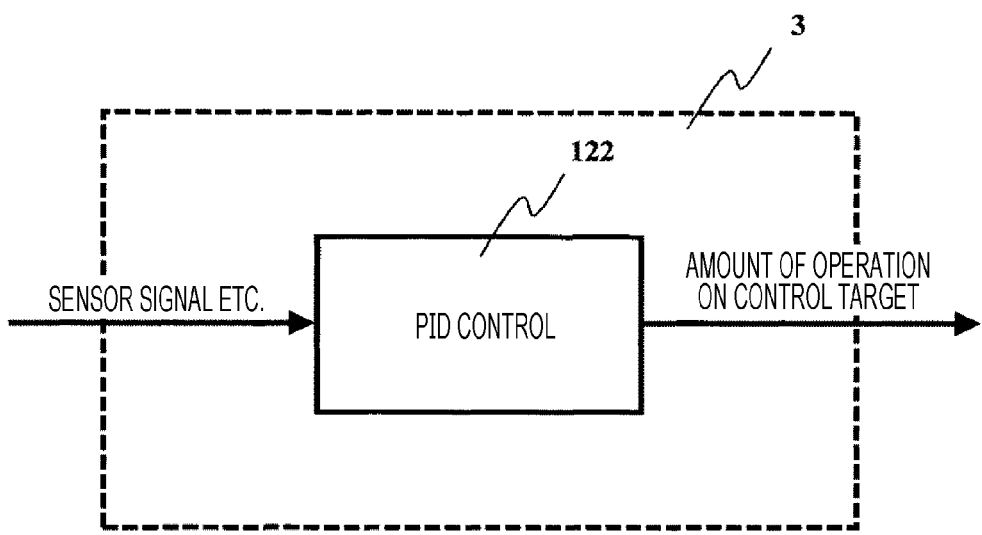
FIG. 6 is a diagram illustrating processing by a control means different from artificial intelligence according to the first to third and fifth to ninth embodiments.

In this process, the amount of an operation to be performed on a control target by a PID control as a control different from artificial intelligence is calculated. FIG. 6 specifically illustrates the process.

The amount of an operation on a control target (the amount of an operation for controlling the robot 7 in the present embodiment) is calculated by a PID control 122 from a sensor signal or the like. Since the PID control is a systematic and proven control, it is possible to ensure control reliability. The PID control will not be described in detail here because there are many known techniques.

<Abnormality Detection Means (FIG. 7)>

In this process, an abnormality in the control using artificial intelligence (machine learning) is detected. FIG. 7 specifically illustrates the process.

The detection target is two-dimensional.

The regions indicated by ranges 1 to 4 are normal operation ranges.

For the parameter value (vector) to be detected, the closest center vectors (indicated with o in the drawings) are specified in the sense of the L2 distance.

When the control parameter value (vector) to be detected is present in the region corresponding to the specified center vector, the center vector is judged as normal, and when it is not present, the center vector is judged as abnormal. For example, a vector A illustrated in FIG. 7 is judged as normal, and a vector B is judged as abnormal.

In the example of FIG. 7, the specified center vector is judged as abnormal when a state in which the control parameter value (vector) to be detected does not exist in the region corresponding to the center vector lasts for a predetermined time. In other words, when a state in which at least one control parameter value does not exist within the predetermined range lasts for a predetermined time, the abnormality detection means 4 (the abnormality detection unit) judges the control means 2 (first control unit) using artificial intelligence as abnormal.

Accordingly, it is possible to prevent the specified center vector from being judged as abnormal because the control parameter value (vector) temporarily exists outside the region corresponding to the specified center vector.

The parameter to be detected may be the amount of an operation corresponding to an output of control using artificial intelligence (machine learning). Alternatively, the parameter to be detected may be an internal parameter calculated inside the control. Although FIG. 7 illustrates the two-dimensional case, the detection target can be extended to N-dimensional (N is a natural number).

<Control Switching Determination Means (FIG. 8)>

Figure 8:
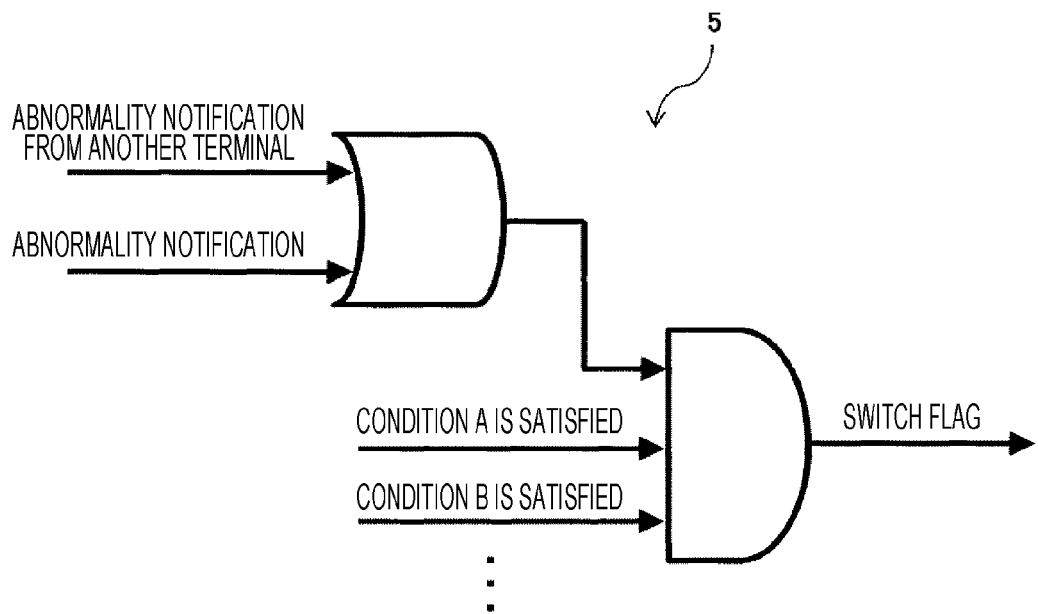
FIG. 8 is a diagram illustrating processing by a control switching determination means according to the first to seventh embodiments.

In this process, control switching determination is performed. FIG. 8 specifically illustrates the process.

A switch flag is turned on (=1) when "'there is an abnormality notification from another terminal' or 'there is an abnormality notification from the own terminal' and 'a condition A is satisfied' and 'a condition B is satisfied'".

The conditions A and B are predetermined switching conditions in the terminal, and, for example, the following conditions can be considered.

Condition A: The control parameter value is in a predetermined range.

Condition B: The change amount of the control parameter value is in a predetermined range.

Thereby, when the control parameter of the terminal is stable, switching of control is permitted.

<Process by the Server (FIG. 9)>

Figure 9:
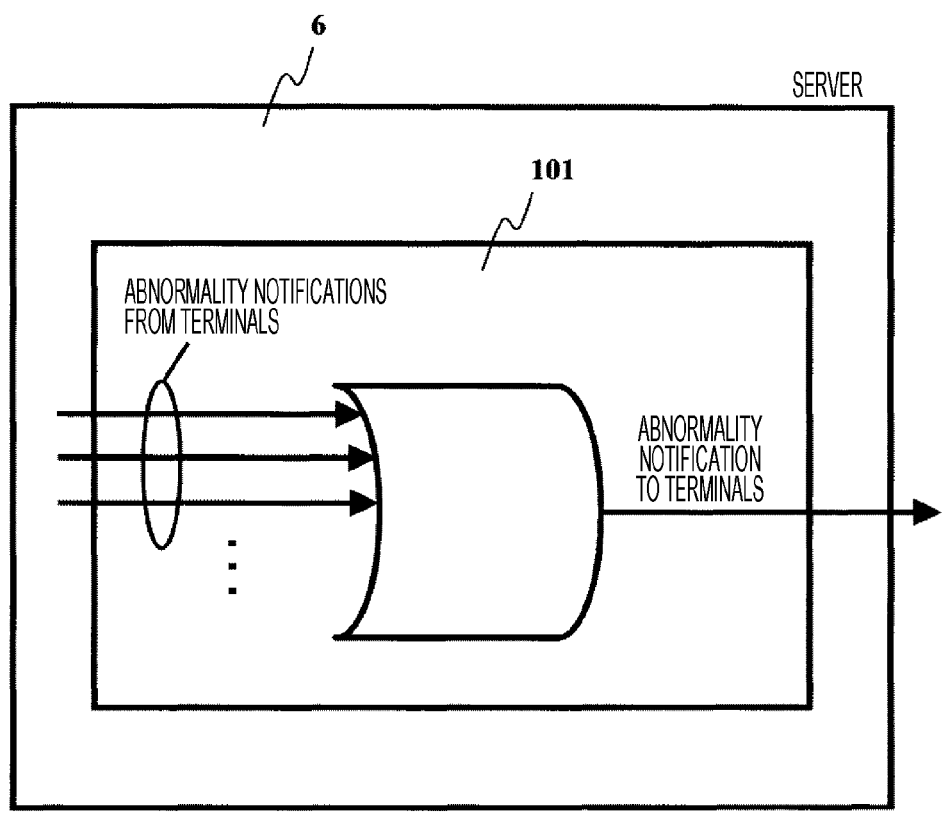
FIG. 9 is a diagram illustrating processing by a server according to the first to fourth embodiments.

In this process, the server notifies an abnormality in a terminal to the other terminals. FIG. 9 specifically illustrates the process.

When there is an abnormality notification from at least one terminal, the abnormality notification is provided to the other terminals.

As described above, according to the configuration described in the present embodiment, when an abnormality occurs in one of the terminals 1 that control the plurality of robots in the production line, the abnormality is notified to the other terminals via the server 6. Even in the terminals without an abnormality, switching takes place from the control means using artificial intelligence (machine learning) to the PID control, in the order in which the predetermined switching condition is satisfied. This makes it possible to prevent the occurrence of an abnormality in the other terminals without an abnormality, thereby improving the reliability of the entire system.

Second Embodiment

In the present embodiment, each of a plurality of terminals includes: a control means using artificial intelligence (machine learning); a control means using PID control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to the PID control.

In the present embodiment, in particular, the control system is a device that controls a plurality of autonomous vehicles.

FIG. 1 is a diagram illustrating the entire control system that is the same as the first embodiment and therefore will not be described in detail.

Figure 10:
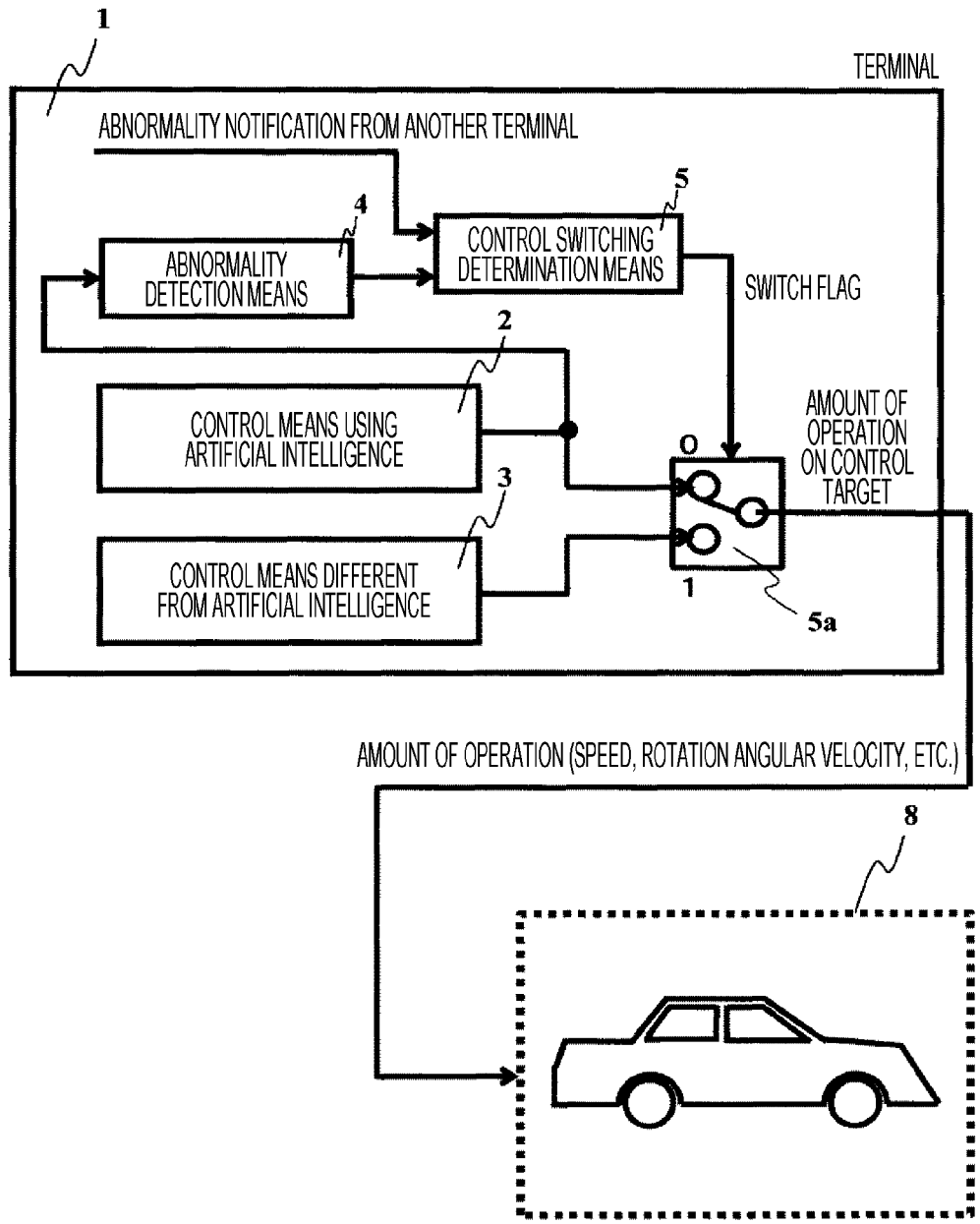
FIG. 10 is a diagram illustrating a terminal (control device) and a control target according to the second and fourth embodiments.

FIG. 10 illustrates an autonomous vehicle 8 controlled by the terminal 1 and the server 6. The control means 2 using artificial intelligence (machine learning) or the control means 3 using the PID control different from the artificial intelligence calculates operation amounts for controlling the autonomous vehicle 8 (for example, target speed, target rotational speed, and others).

FIG. 3 is a system configuration diagram of the terminal 1 that is the same as the first embodiment and therefore will not be described in detail.

FIG. 4 is a system configuration diagram of the server 6 that is the same as the first embodiment and therefore will not be described in detail. The details of each of the processes will be described below.

<Control Means Using Artificial Intelligence (FIG. 5)>

In this process, the amount of an operation to be performed on a control target by a control using artificial intelligence (machine learning) is calculated. FIG. 5 specifically illustrates the process that is the same as the first embodiment and therefore will not be described in detail.

<Control Means Different from Artificial Intelligence (FIG. 6)>

In this process, the amount of an operation to be performed on a control target by a PID control as a control different from artificial intelligence is calculated. FIG. 6 specifically illustrates the process that is the same as the first embodiment and therefore will not be described in detail.

<Abnormality Detection Means (FIG. 7)>

In this process, an abnormality in the control using artificial intelligence (machine learning) is detected. FIG. 7 specifically illustrates the process that is the same as the first embodiment and therefore will not be described in detail.

<Control Switching Determination Means (FIG. 8)>

In this process, control switching determination is performed. FIG. 8 specifically illustrates the process that is the same as the first embodiment and therefore will not be described in detail.

<Process by the Server (FIG. 9)>

In this process, the server notifies an abnormality in a terminal to the other terminals. FIG. 9 specifically illustrates the process that is the same as the first embodiment and therefore will not be described in detail.

As described above, according to the configuration described in the present embodiment, when an abnormality occurs in one of the terminals 1 that control the plurality of autonomous vehicles, the abnormality is notified to the other terminals via the server 6. Even in the terminals without an abnormality, switching takes place from the control means using artificial intelligence (machine learning) to the PID control, in the order in which the predetermined switching condition is satisfied. This makes it possible to prevent the occurrence of an abnormality in the other terminals without an abnormality, thereby improving the reliability of the entire system.

Third Embodiment

In the present embodiment, each of a plurality of terminals includes: a control means using artificial intelligence (machine learning); a control means using PID control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to the PID control.

In the present embodiment, in particular, the control system is a device that controls a plurality of drones.

FIG. 1 is a diagram illustrating the entire control system that is the same as the first embodiment and therefore will not be described in detail.

Figure 11:
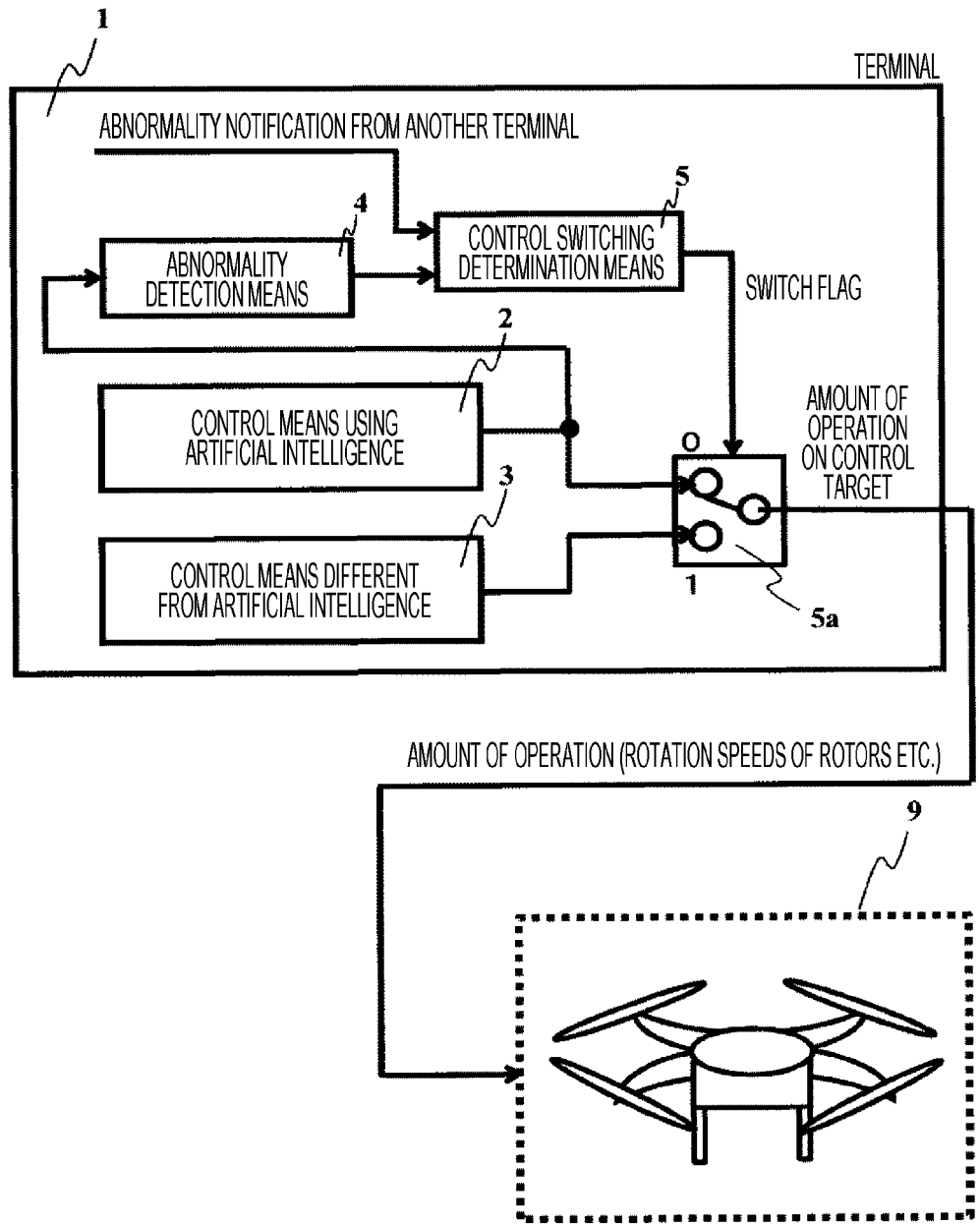
FIG. 11 is a diagram illustrating a terminal (control device) and a control target according to the third embodiment.

FIG. 11 illustrates a drone 9 controlled by the terminal 1 and the server 6. The control means 2 using artificial intelligence (machine learning) or the control means 3 using the PID control different from the artificial intelligence calculate operation amounts for controlling the drone 9 (for example, target rotational speeds of rotors and others).

FIG. 3 is a system configuration diagram of the terminal 1 that is the same as the first embodiment and therefore will not be described in detail.

FIG. 4 is a system configuration diagram of the server 6 that is the same as the first embodiment and therefore will not be described in detail. The details of each of the processes will be described below.

<Control Means Using Artificial Intelligence (FIG. 5)>

In this process, the amount of an operation to be performed on a control target by a control using artificial intelligence (machine learning) is calculated. FIG. 5 specifically illustrates the process that is the same as the first embodiment and therefore will not be described in detail.

<Control Means Different from Artificial Intelligence (FIG. 6)>

In this process, the amount of an operation to be performed on a control target by a PID control as a control different from artificial intelligence is calculated. FIG. 6 specifically illustrates the process that is the same as the first embodiment and therefore will not be described in detail.

<Abnormality Detection Means (FIG. 7)>

In this process, an abnormality in the control using artificial intelligence (machine learning) is detected. FIG. 7 specifically illustrates the process that is the same as the first embodiment and therefore will not be described in detail.

<Control Switching Determination Means (FIG. 8)>

In this process, control switching determination is performed. FIG. 8 specifically illustrates the process that is the same as the first embodiment and therefore will not be described in detail.

<Process by the Server (FIG. 9)>

In this process, the server notifies an abnormality in a terminal to the other terminals. FIG. 9 specifically illustrates the process that is the same as the first embodiment and therefore will not be described in detail.

As described above, according to the configuration described in the present embodiment, when an abnormality occurs in one of the terminals 1 that control the plurality of drones, the abnormality is notified to the other terminals via the server 6. Even in the terminals without an abnormality, switching takes place from the control means using artificial intelligence (machine learning) to the PID control, in the order in which the predetermined switching condition is satisfied. This makes it possible to prevent the occurrence of an abnormality in the other terminals without an abnormality, thereby improving the reliability of the entire system.

Fourth Embodiment

In the present embodiment, each of a plurality of terminals includes: a control means using artificial intelligence (machine learning); a control means using a control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to manual control.

In the present embodiment, in particular, the control system is a device that controls a plurality of autonomous vehicles, and the control means different from artificial intelligence is manual control.

FIG. 1 is a diagram illustrating the entire control system that is the same as the first embodiment and therefore will not be described in detail.

FIG. 10 illustrates an autonomous vehicle 8 controlled by the terminal 1 and the server 6. The control means 2 using artificial intelligence (machine learning) or the control means 3 using the manual control different from the artificial intelligence calculate operation amounts for controlling the autonomous vehicle 8 (for example, target speed, target rotational speed, and others). In the case of manual control, devices for determining the target speed and the target rotational speed are an accelerator, a brake, and a steering wheel.

FIG. 3 is a system configuration diagram of the terminal 1 that is the same as the first embodiment and therefore will not be described in detail.

FIG. 4 is a system configuration diagram of the server 6 that is the same as the first embodiment and therefore will not be described in detail. The details of each of the processes will be described below.

<Control Means Using Artificial Intelligence (FIG. 5)>

In this process, the amount of an operation to be performed on a control target by a control using artificial intelligence (machine learning) is calculated. FIG. 5 specifically illustrates the process that is the same as the first embodiment and therefore will not be described in detail.

<Control Means Different from Artificial Intelligence (FIG. 12)>

Figure 12:
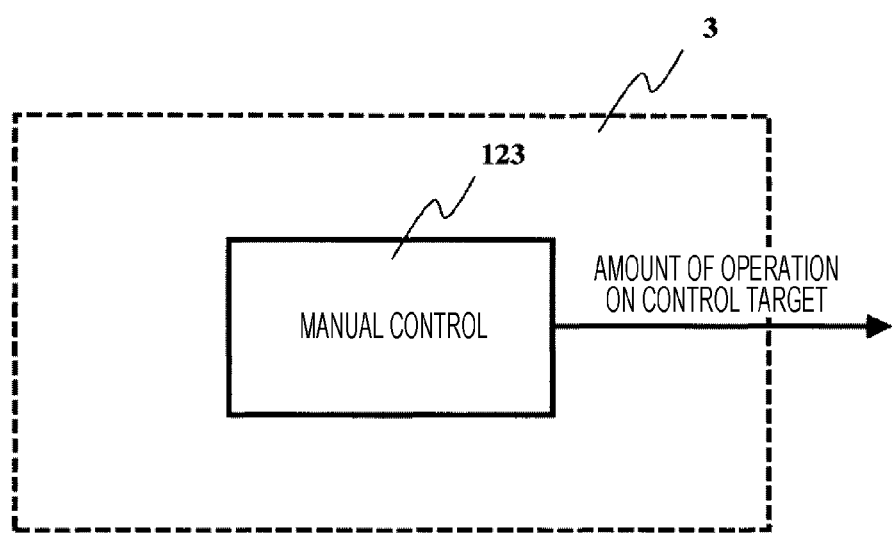
FIG. 12 is a diagram illustrating processing by a control means different from artificial intelligence according to the fourth embodiment.

In this process, the control target is operated by manual control which is different from artificial intelligence. FIG. 12 specifically illustrates the process.

Here, manual control refers to control using an accelerator, a brake, and a steering wheel by a driver. The depression amount of the accelerator pedal, the depression amount of the brake pedal, and the steering angle of the steering wheel are respectively detected by, for example, an accelerator position sensor, a brake pedal position sensor, and a steering angle sensor. In manual control 123, the operation amount to the control target is calculated based on the values detected by the sensors. Thereby, the control of the control target can be continued manually.

<Abnormality Detection Means (FIG. 7)>

In this process, an abnormality in the control using artificial intelligence (machine learning) is detected. FIG. 7 specifically illustrates the process that is the same as the first embodiment and therefore will not be described in detail.

<Control Switching Determination Means (FIG. 8)>

In this process, control switching determination is performed. FIG. 8 specifically illustrates the process that is the same as the first embodiment and therefore will not be described in detail.

<Process by the Server (FIG. 9)>

In this process, it is performed by the server. The server notifies an abnormality in a terminal to the other terminals. FIG. 9 specifically illustrates the process that is the same as the first embodiment and therefore will not be described in detail.

As described above, according to the configuration described in the present embodiment, when an abnormality occurs in one of the terminals 1 that control the plurality of autonomous vehicles, the abnormality is notified to the other terminals via the server 6. Even in the terminals without an abnormality, switching takes place from the control means using artificial intelligence (machine learning) to the manual control, in the order in which the predetermined switching condition is satisfied. This makes it possible to prevent the occurrence of an abnormality in the other terminals without an abnormality, thereby improving the reliability of the entire system.

Fifth Embodiment

In the present embodiment, each of a plurality of terminals includes: a control means using artificial intelligence (machine learning); a control means using PID control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to the PID control. The control system is a device that controls a plurality of robots.

In particular, during PID control execution, the parameter value of control using artificial intelligence (machine learning) is updated by learning processing.

FIG. 1 is a diagram illustrating the entire control system that is the same as the first embodiment and therefore will not be described in detail.

Although FIG. 2 illustrates the robot 7 of the production line controlled by the terminal 1 and the server 6, since it is the same as that of the first embodiment, it is not described in detail.

FIG. 3 is a system configuration diagram of the terminal 1 that is the same as the first embodiment and therefore will not be described in detail.

FIG. 4 is a system configuration diagram of the server 6 that is the same as the first embodiment and therefore will not be described in detail. The details of each of the processes will be described below.

<Control Means Using Artificial Intelligence (FIG. 5)>

In this process, the amount of an operation to be performed on a control target by a control using artificial intelligence (machine learning) is calculated. FIG. 5 specifically illustrates the process that is the same as the first embodiment and therefore will not be described in detail.

<Control Means Different from Artificial Intelligence (FIG. 6)>

In this process, the amount of an operation to be performed on a control target by a PID control as a control different from artificial intelligence is calculated. FIG. 6 specifically illustrates the process that is the same as the first embodiment and therefore will not be described in detail.

<Abnormality Detection Means (FIG. 7)>

In this process, an abnormality in the control using artificial intelligence (machine learning) is detected. FIG. 7 specifically illustrates the process that is the same as the first embodiment and therefore will not be described in detail.

<Control Switching Determination Means (FIG. 8)>

In this process, control switching determination is performed. FIG. 8 specifically illustrates the process that is the same as the first embodiment and therefore will not be described in detail.

<Processing by the Server (FIG. 13)>

Figure 13:
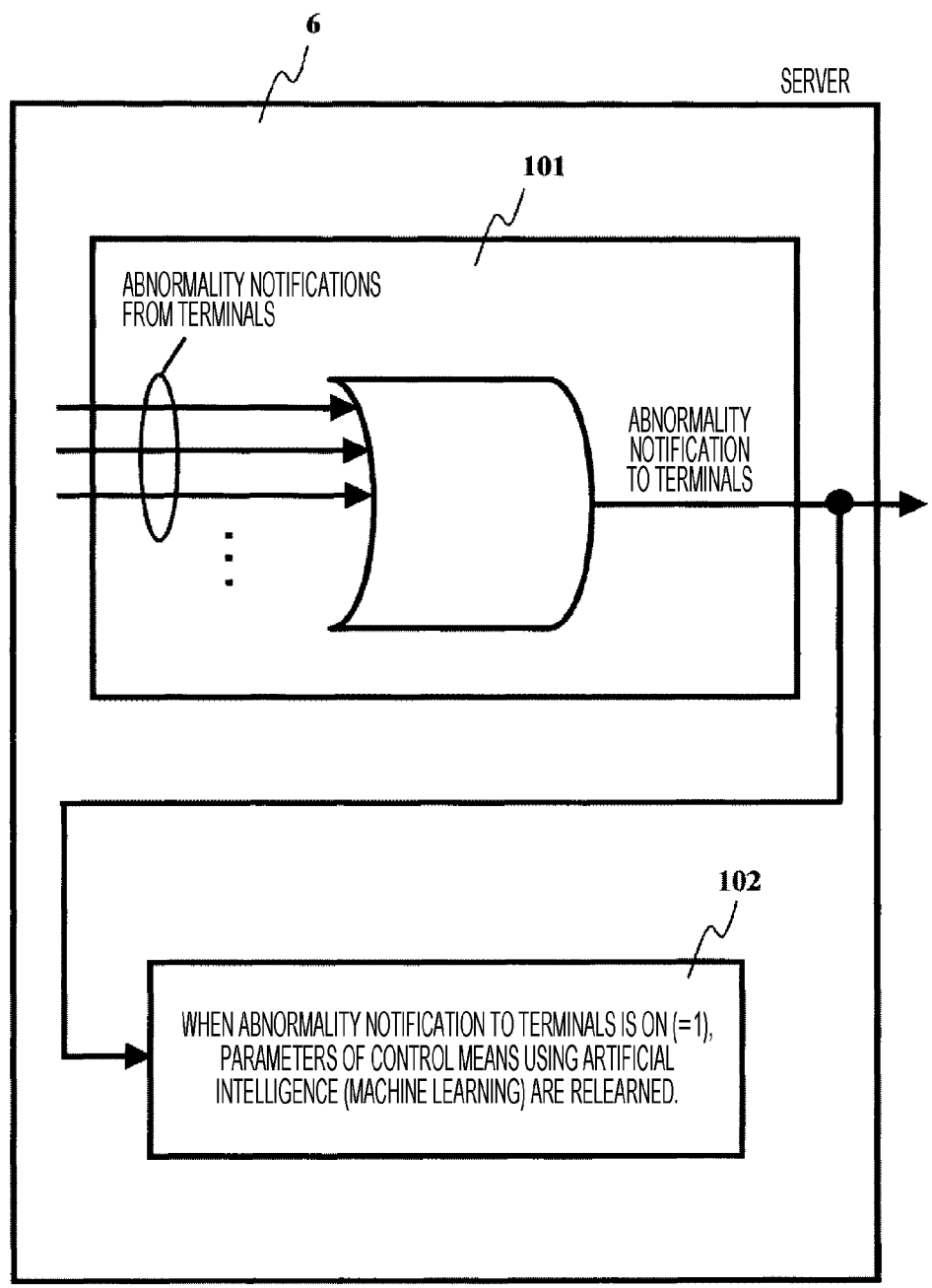
FIG. 13 is a diagram illustrating processing by a server according to the fifth embodiment.

In this process, the server notifies an abnormality in a terminal to the other terminals. FIG. 13 specifically illustrates the process.

When there is an abnormality notification from at least one terminal, the abnormality notification is provided to the other terminals.

When abnormality notification to each of the terminals is ON (=1), parameters of a control means (machine learning) using artificial intelligence is relearned.

The method of machine learning of parameters will not be described in detail here because there are many known techniques. For example, as a method for deep learning, there is an error backpropagation method.

As described above, according to the configuration described in the present embodiment, when an abnormality occurs in one of the terminals 1 that control the plurality of robots in the production line, the abnormality is notified to the other terminals via the server 6. Even in the terminals without an abnormality, switching takes place from the control means using artificial intelligence (machine learning) to the PID control, in the order in which the predetermined switching condition is satisfied. This makes it possible to prevent the occurrence of an abnormality in the other terminals without an abnormality, thereby improving the reliability of the entire system.

Also, during the execution of a PID control, the server relearns parameters of the control using artificial intelligence (machine learning), and thus it is possible to eliminate the abnormality and expect performance improvement at the next time of control execution using artificial intelligence (machine learning).

Sixth Embodiment

In the present embodiment, each of a plurality of terminals includes: a control means using artificial intelligence (machine learning); a control means using PID control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to the PID control. The control system is a device that controls a plurality of robots.

In particular, the control system is characterized in, during execution of a PID control, updating the parameter values of the control using artificial intelligence (machine learning) in the learning process, and after completion of the update of the parameter values of the control using artificial intelligence (machine learning), switching from the PID control to the control using artificial intelligence (machine learning).

FIG. 1 is a diagram illustrating the entire control system that is the same as the first embodiment and therefore will not be described in detail.

Although FIG. 2 illustrates the robot 7 of the production line controlled by the terminal 1 and the server 6, since it is the same as that of the first embodiment, it is not described in detail.

Figure 14:
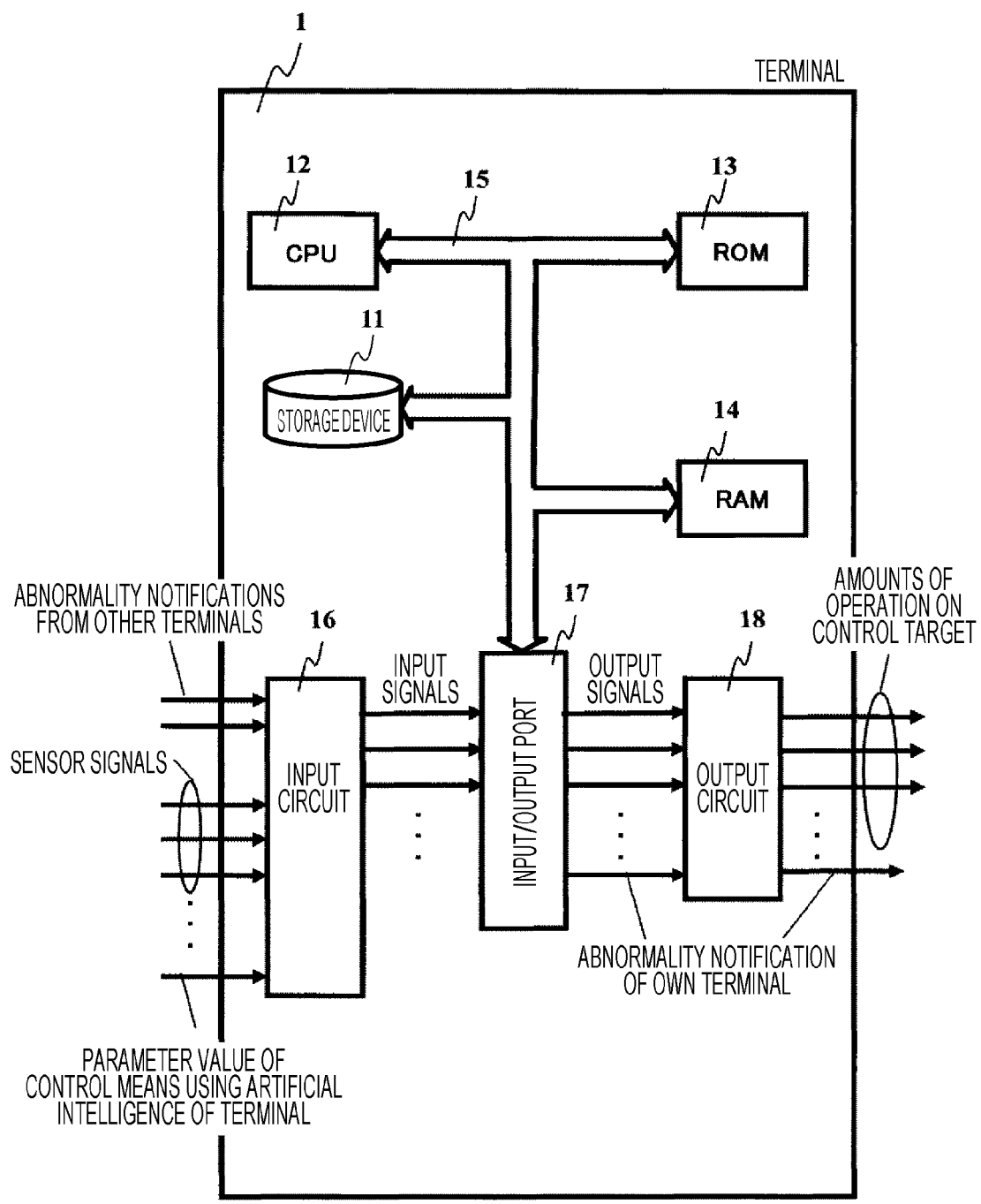
FIG. 14 is a system configuration diagram of a terminal (control device) according to the sixth embodiment.

FIG. 14 is a system configuration diagram of the terminal 1. As signals to be input to the input circuit 16, parameter values of a control means using artificial intelligence of the terminal are added. In other words, the input circuit 16 (reception unit) receives the control parameter values learned by the server. The other aspects are the same as in the first embodiment and therefore will not be described in detail.

Figure 15:
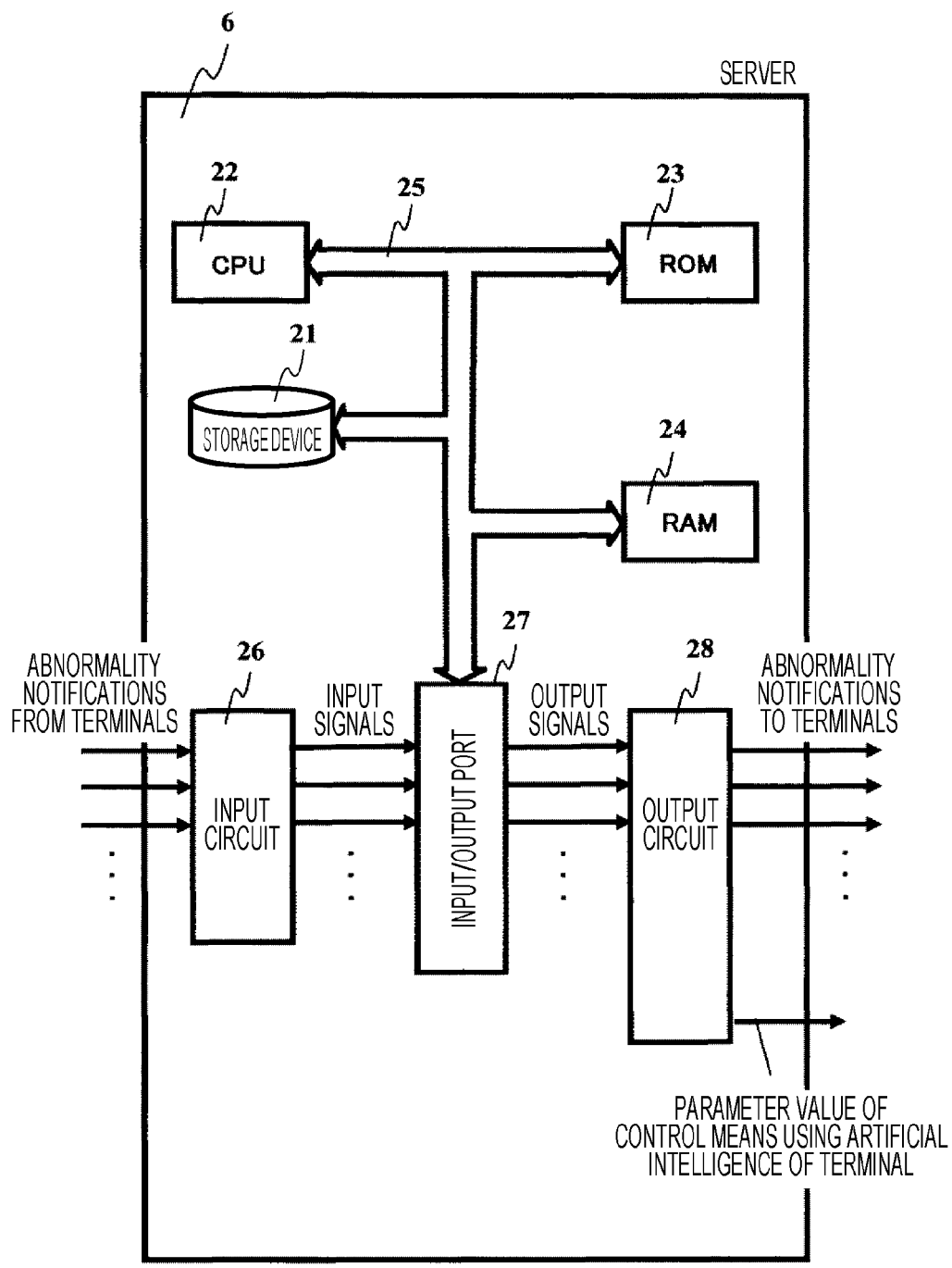
FIG. 15 is a system configuration diagram of a server according to the sixth embodiment.

FIG. 15 is a system configuration diagram of the server 6. As signals to be output from the output circuit 28, parameter values of a control means using artificial intelligence of the terminal are added. The other aspects are the same as in the first embodiment and therefore will not be described in detail. The details of each of the processes will be described below.

<Control Means Using Artificial Intelligence (FIG. 5)>

In this process, the amount of an operation to be performed on a control target by a control using artificial intelligence (machine learning) is calculated. FIG. 5 specifically illustrates the process that is the same as the first embodiment and therefore will not be described in detail.

<Control Means Different from Artificial Intelligence (FIG. 6)>

In this process, the amount of an operation to be performed on a control target by a PID control as a control different from artificial intelligence is calculated. FIG. 6 specifically illustrates the process that is the same as the first embodiment and therefore will not be described in detail.

<Abnormality Detection Means (FIG. 7)>

In this process, an abnormality in the control using artificial intelligence (machine learning) is detected. FIG. 7 specifically illustrates the process that is the same as the first embodiment and therefore will not be described in detail.

<Control Switching Determination Means (FIG. 8)>

In this process, control switching determination is performed. FIG. 8 specifically illustrates the process that is the same as the first embodiment and therefore will not be described in detail.

<Processing by the Server (FIG. 16)>

Figure 16:
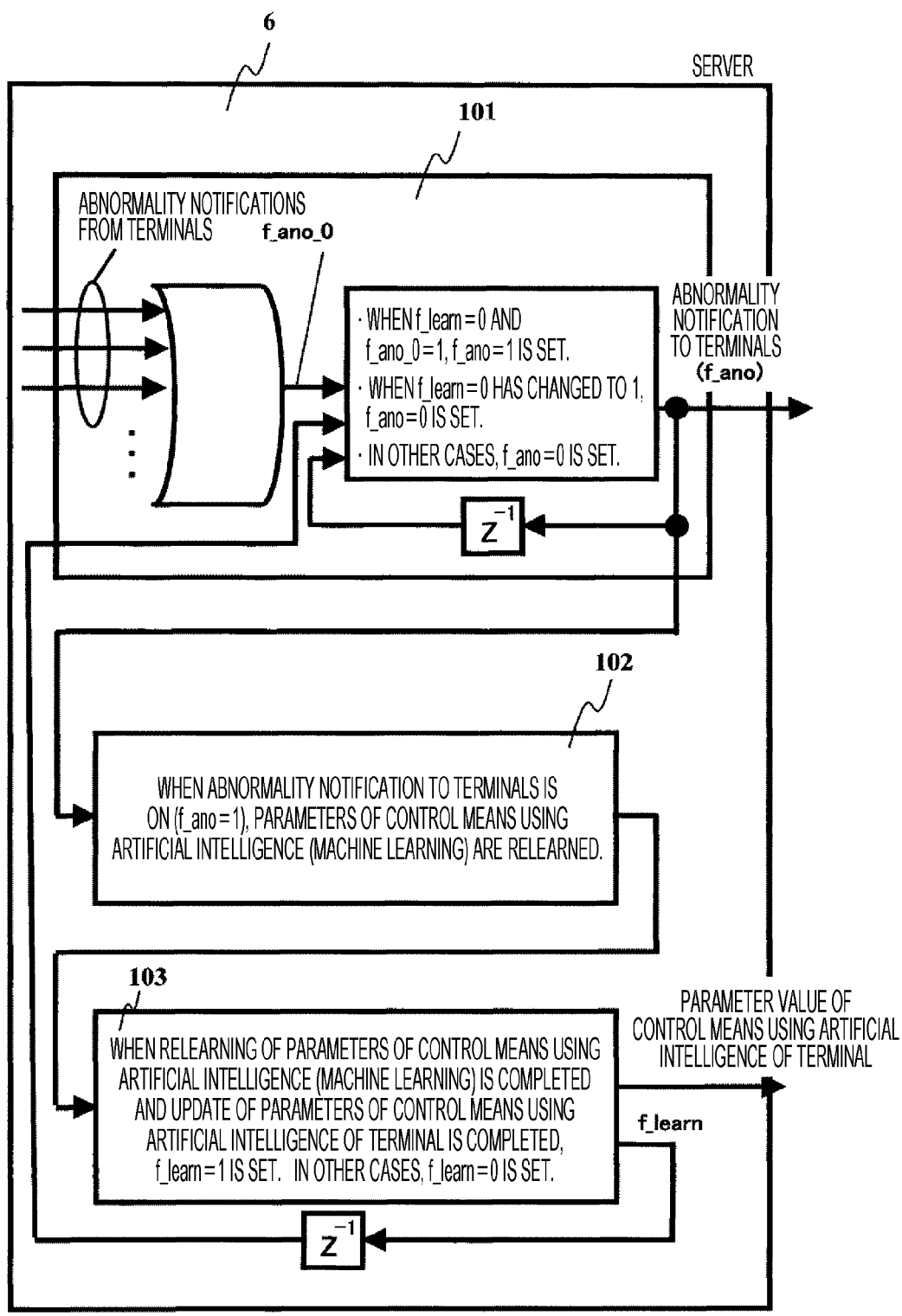
FIG. 16 is a diagram illustrating processing by a server according to the sixth embodiment.

In this process, the server notifies an abnormality in a terminal to the other terminals. FIG. 16 specifically illustrates the process. Note that f_ano_0 is a flag indicating whether there has been an abnormality notification from at least one terminal, f_learn is a flag indicating whether relearning and updating of parameters have been completed, and f_ano is a flag as an abnormality notification to each of the terminals.

Specifically, f_ano_0, f_learn, and f_ano are set as follows.

Set f_ano_0=1 when there is an abnormality notification from at least one terminal.

i) When f_learn=0 (relearning or updating of parameters is not completed) and f_ano_0=1 (there is an abnormality notification from at least one terminal), f_ano=1 (abnormality notification: ON) is set.

ii) When f_learn=0→1 (relearning and updating of parameters is completed), f_ano=0 (abnormality notification: OFF) is set.

iii) Otherwise, f_ano=0 is set.

When f_ano=1, the other terminals are notified of an abnormality.

When an abnormality notification to each of the terminals is ON (f_ano=1), parameters of a control means (machine learning) using artificial intelligence is relearned.

The method of machine learning of parameters will not be described in detail here because there are many known techniques. For example, as a method for deep learning, there is an error backpropagation method.

When the relearning of the parameters of the control means (machine learning) using artificial intelligence is completed and the parameters of the control means using artificial intelligence of the terminal are transmitted to the terminal and updating is completed, f_learn=1 is set. Otherwise, f_learn=0 is set.

While the control means 3 (the second control unit) performs a control different from artificial intelligence, the control means 2 (the first control unit) of each of the terminals 1 updates the control parameter values stored in the storage device 11 (the storage unit) of the terminal 1 to the control parameter values learned by the server 6. After the updating of the control parameter values, the control switching unit (the switching determination unit 5, switch 5a) switches from the control different from artificial intelligence to the control using artificial intelligence. Accordingly, after removing the factor in possibly causing an abnormality in the control using artificial intelligence, it is possible to return to the control using artificial intelligence.

As described above, according to the configuration described in the present embodiment, when an abnormality occurs in one of the terminals 1 that control the plurality of robots in the production line, the abnormality is notified to the other terminals via the server 6. Even in the terminals without an abnormality, switching takes place from the control means using artificial intelligence (machine learning) to the PID control, in the order in which the predetermined switching condition is satisfied. This makes it possible to prevent the occurrence of an abnormality in the other terminals without an abnormality, thereby improving the reliability of the entire system.

Also, during the execution of a PID control, the server relearns parameters of the control using artificial intelligence (machine learning) and after the completion of the relearning of the parameters, the server re-switches to the control using artificial intelligence (machine learning). This makes it possible to minimize the period of the PID control and eliminate the abnormality and expect performance improvement at the next time of control execution using artificial intelligence (machine learning).

Seventh Embodiment

In the present embodiment, each of a plurality of terminals includes: a control means using artificial intelligence (machine learning); a control means using PID control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to the PID control. The control system is a device that controls a plurality of robots.

In particular, the control system is composed of only terminals, and when an abnormality occurs in the control means using artificial intelligence (machine learning) in at least one of the plurality of terminals, an inter-terminal communication means notifies the abnormality in the control means using artificial intelligence (machine learning) to the terminals without an abnormality among the plurality of terminals.

Figure 17:
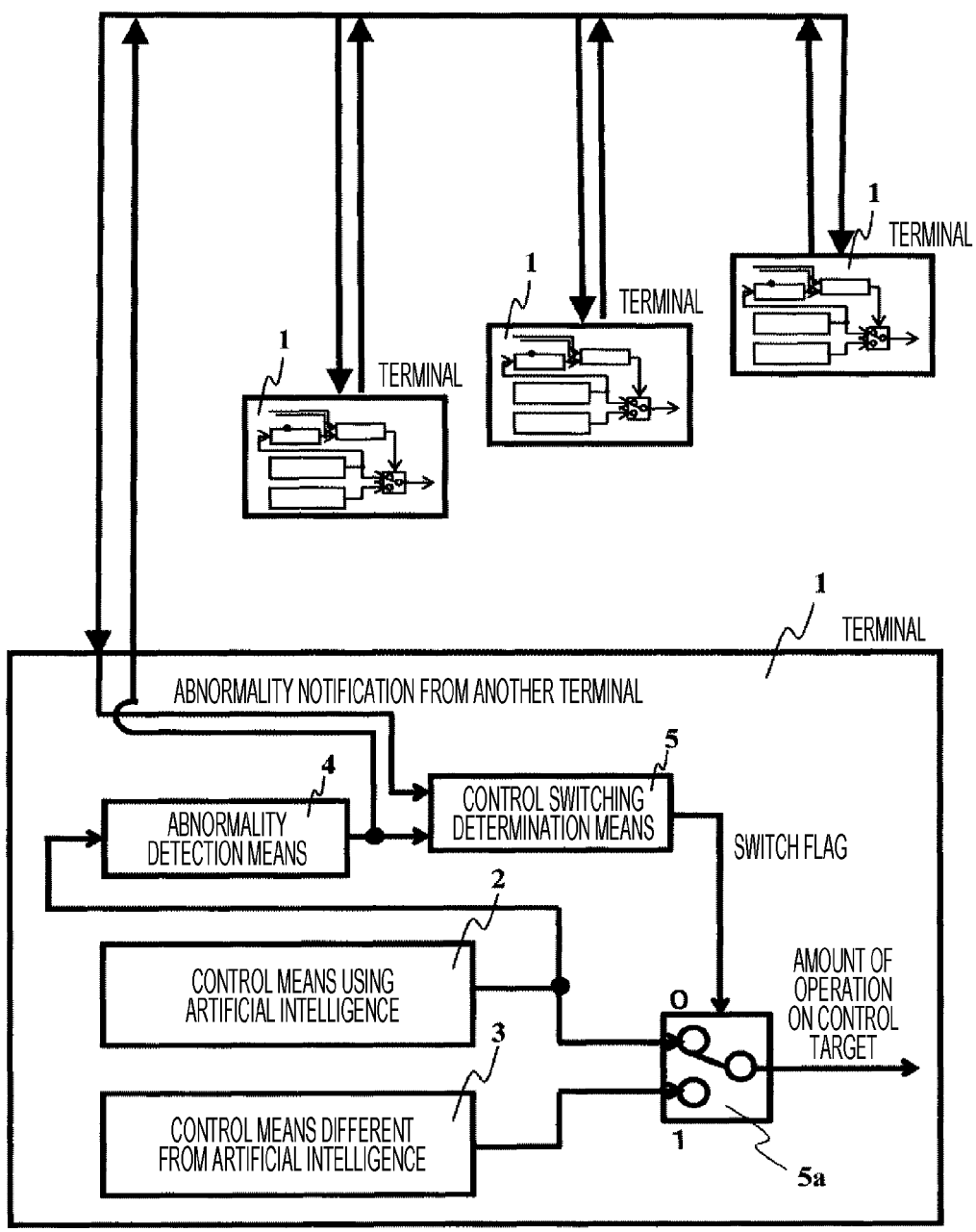
FIG. 17 is an overall view of a control system according to the seventh embodiment.

FIG. 17 is a diagram illustrating the entire control system. A plurality of terminals 1 transmits and receives information via inter-terminal communication. When an abnormality occurs in one of the terminals 1, the occurrence of the abnormality is notified to the other terminals via inter-terminal communication. For example, without the need for a server, the cost of the control system can be reduced, for example. The other aspects are the same as in the first embodiment and therefore will not be described in detail.

Although FIG. 2 illustrates the robot 7 of the production line controlled by the terminal 1 and the server 6, since it is the same as that of the first embodiment, it is not described in detail.

FIG. 3 is a system configuration diagram of the terminal 1 that is the same as the first embodiment and therefore will not be described in detail. The details of each of the processes will be described below.

<Control Means Using Artificial Intelligence (FIG. 5)>

In this process, the amount of an operation to be performed on a control target by a control using artificial intelligence (machine learning) is calculated. FIG. 5 specifically illustrates the process that is the same as the first embodiment and therefore will not be described in detail.

<Control Means Different from Artificial Intelligence (FIG. 6)>

In this process, the amount of an operation to be performed on a control target by a PID control as a control different from artificial intelligence is calculated. FIG. 6 specifically illustrates the process that is the same as the first embodiment and therefore will not be described in detail.

<Abnormality Detection Means (FIG. 7)>

In this process, an abnormality in the control using artificial intelligence (machine learning) is detected. FIG. 7 specifically illustrates the process that is the same as the first embodiment and therefore will not be described in detail.

<Control Switching Determination Means (FIG. 8)>

In this process, control switching determination is performed. FIG. 8 specifically illustrates the process that is the same as the first embodiment and therefore will not be described in detail.

As described above, according to the configuration described in the present embodiment, when an abnormality occurs in one of the terminals 1 that control the plurality of robots in the production line, the abnormality is notified to the other terminals via inter-terminal communication. Even in the terminals without an abnormality, switching takes place from the control means using artificial intelligence (machine learning) to the PID control, in the order in which the predetermined switching condition is satisfied. This makes it possible to prevent the occurrence of an abnormality in the other terminals without an abnormality, thereby improving the reliability of the entire system.

Eighth Embodiment

In the present embodiment, each of a plurality of terminals includes: a control means using artificial intelligence (machine learning); a control means using PID control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to the PID control. The control system is a device that controls a plurality of robots.

In particular, in the present embodiment, information for synchronization of switching timing is transmitted to all the terminals so that the terminals switch from the control using artificial intelligence (machine learning) to the PID control at the same time.

Figure 18:
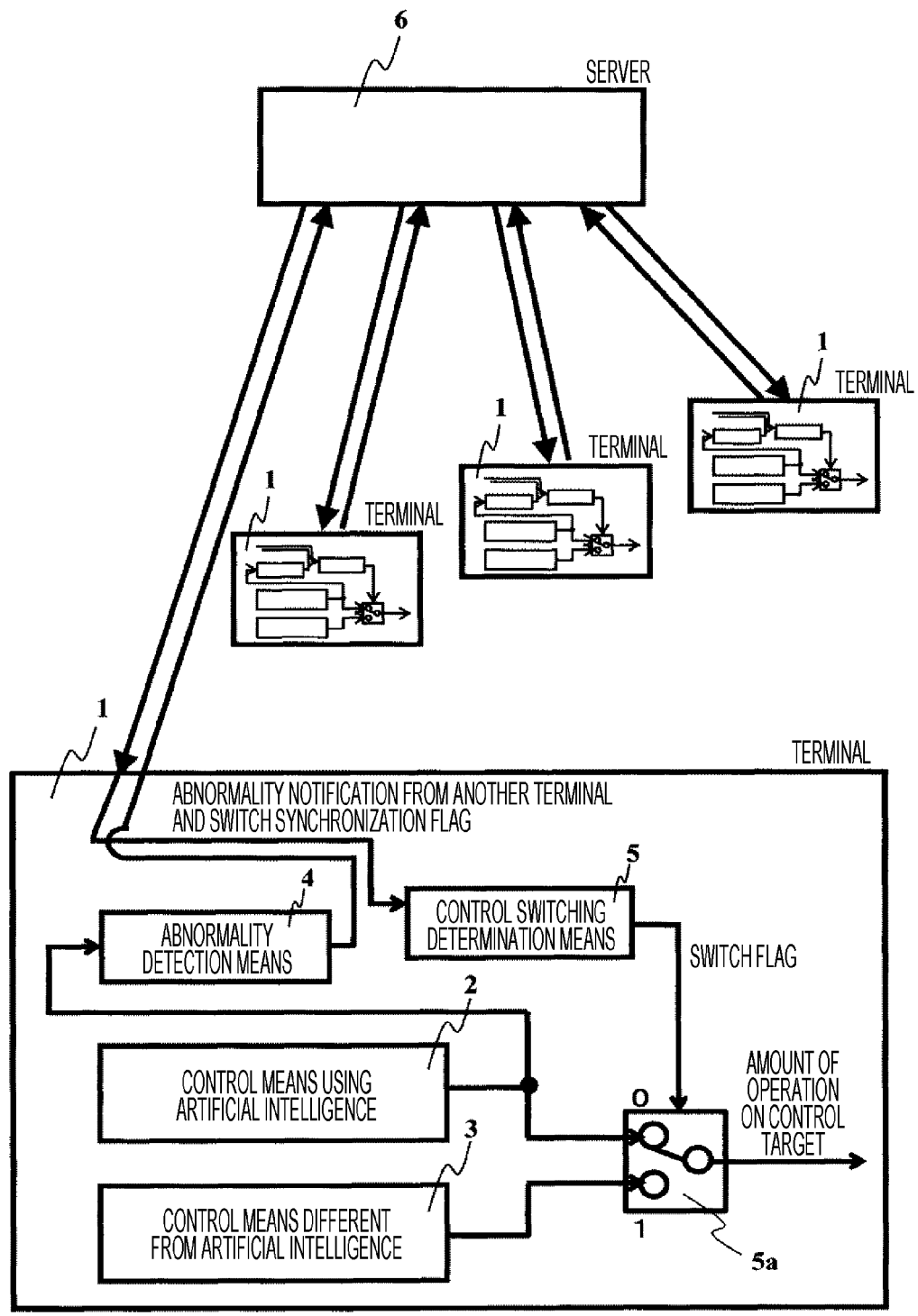
FIG. 18 is an overall view of a control system according to the eighth embodiment.

FIG. 18 is a diagram illustrating the entire control system. A control switching determination means 5 calculates a switch flag for switching of controls based on an abnormality notification from another terminal and a switch synchronization flag. The other aspects are the same as in the first embodiment and therefore will not be described in detail.

Figure 19:
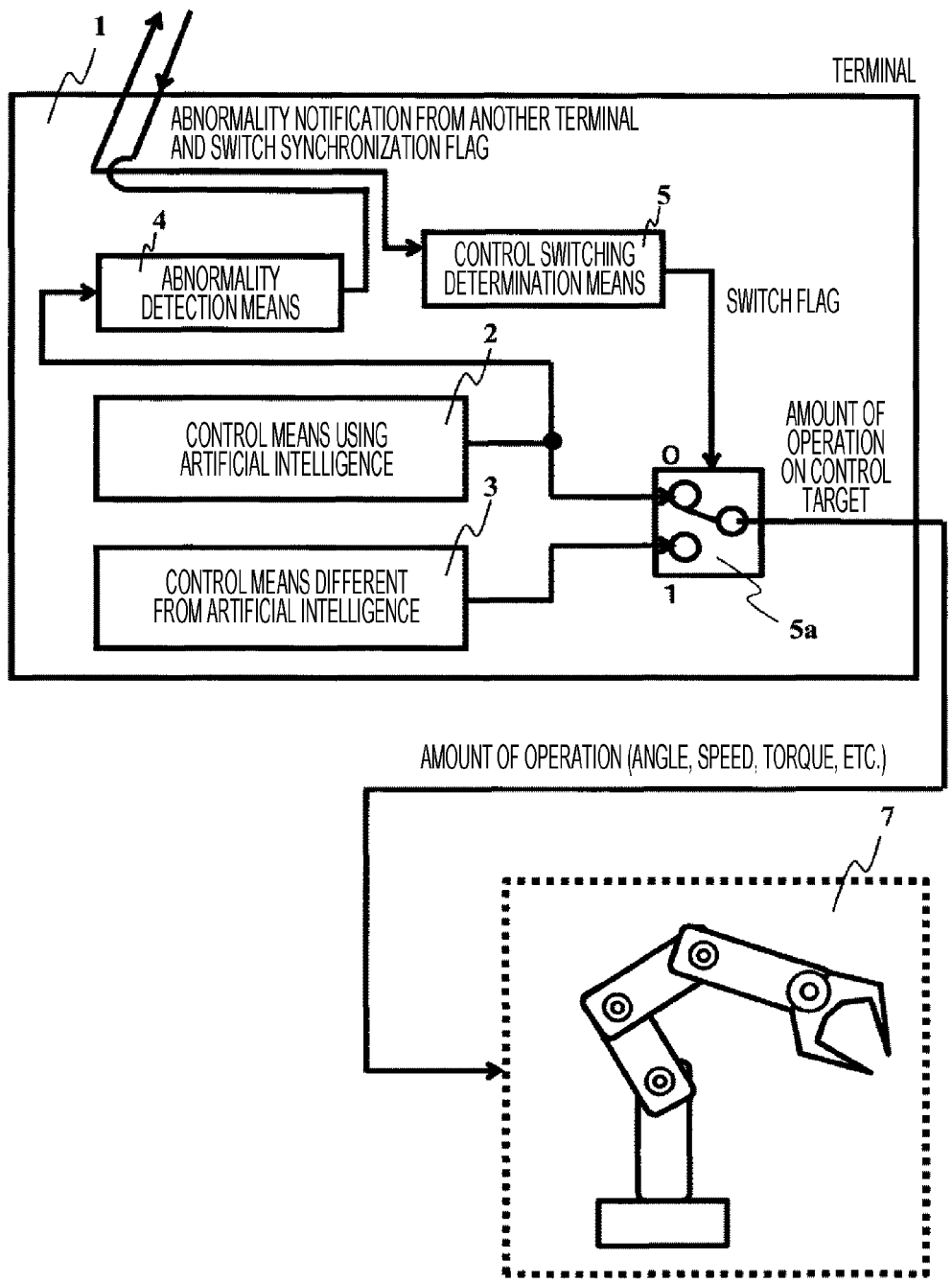
FIG. 19 is a diagram illustrating a terminal (control device) and a control target according to the eighth embodiment.

FIG. 19 illustrates a robot 7 in a production line controlled by the terminal 1 and the server 6. A control switching determination means 5 calculates a switch flag for switching of controls based on an abnormality notification from another terminal and a switch synchronization flag. The other aspects are the same as in the first embodiment and therefore will not be described in detail.

FIG. 3 is a system configuration diagram of the terminal 1 that is the same as the first embodiment and therefore will not be described in detail.

FIG. 4 is a system configuration diagram of the server 6 that is the same as the first embodiment and therefore will not be described in detail. The details of each of the processes will be described below.

<Control Means Using Artificial Intelligence (FIG. 5)>

In this process, the amount of an operation to be performed on a control target by a control using artificial intelligence (machine learning) is calculated. FIG. 5 specifically illustrates the process that is the same as the first embodiment and therefore will not be described in detail.

<Control Means Different from Artificial Intelligence (FIG. 6)>

In this process, the amount of an operation to be performed on a control target by a PID control as a control different from artificial intelligence is calculated. FIG. 6 specifically illustrates the process that is the same as the first embodiment and therefore will not be described in detail.

<Abnormality Detection Means (FIG. 7)>

In this process, an abnormality in the control using artificial intelligence (machine learning) is detected. FIG. 7 specifically illustrates the process that is the same as the first embodiment and therefore will not be described in detail.

<Control Switching Determination Means (FIG. 20)>

Figure 20:
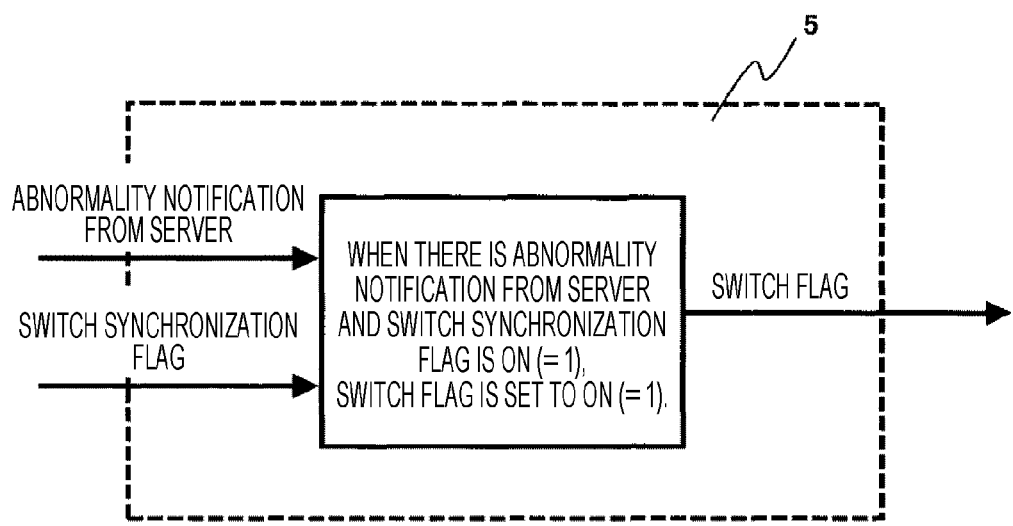
FIG. 20 is a diagram illustrating processing by a control switching determination means according to the eighth embodiment.

In this process, control switching determination is performed. FIG. 20 specifically illustrates the process.

When there is an abnormality notification from the server and the switching synchronization flag is ON (=1), the switch flag is turned ON (=1). In other words, the input circuit 16 (reception unit) of each of the terminals 1 receives the switching synchronization flag, and when receiving the abnormality notification and the switching synchronization flag, the control switching unit (the switching determination unit 5, the switch 5a) of each of the terminals 1 switches from the control using artificial intelligence to the control different from artificial intelligence. Thereby, the plurality of terminals 1 can be synchronized in the timing for control switching.

<Process by the Server (FIG. 21)>

Figure 21:
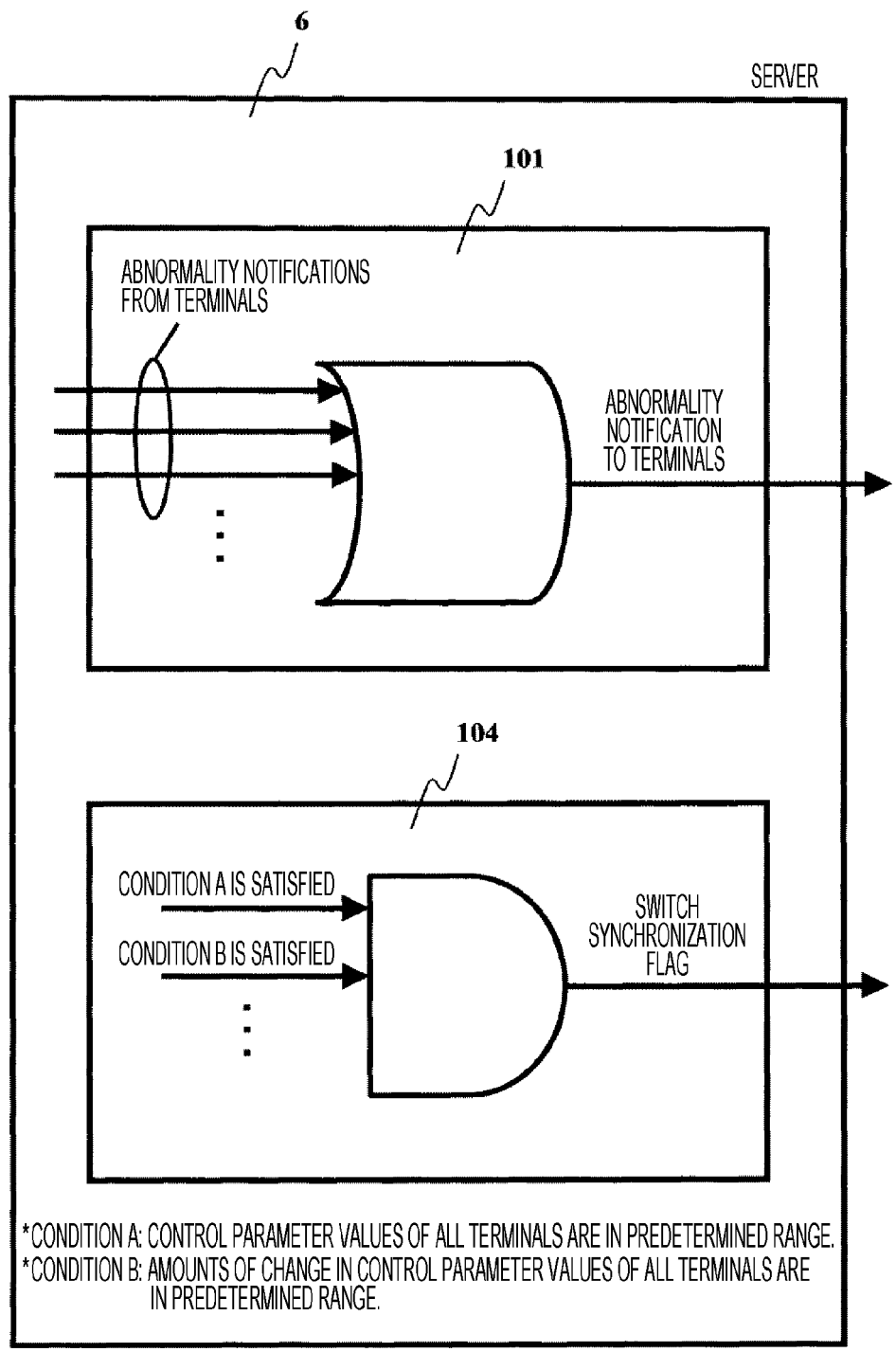
FIG. 21 is a diagram illustrating processing by a server according to the eighth embodiment.

In this process, it is performed by the server. The server notifies an abnormality in a terminal to the other terminals. FIG. 21 specifically illustrates the process.

When there is an abnormality notification from at least one terminal, the abnormality notification is provided to the other terminals.

When "'condition A is satisfied' and 'condition B is satisfied'", the switching synchronization flag is turned ON (=1). The conditions A and B are predetermined switching conditions in all the terminals, and, for example, the following conditions can be considered.

Condition A: The control parameter values of all the terminals are in a predetermined range.

Condition B: The amounts of change in the control parameter values of all the terminals are in a predetermined range.

Thereby, when the control parameters of all the terminals are stable, switching of control in all the terminals is permitted.

The output circuit 28 (transmission unit) of the server 6 transmits a switching synchronization flag for synchronizing the timing of switching from the control using artificial intelligence to the control different from artificial intelligence to all the terminals 1.

As described above, according to the configuration described in the present embodiment, when an abnormality occurs in one of the terminals 1 that control the plurality of robots in the production line, the abnormality is notified to the other terminals via the server 6. Even in the terminals without an abnormality, switching takes place from the control using artificial intelligence (machine learning) to the PID control, in the order in which the predetermined switching condition is satisfied. This makes it possible to prevent the occurrence of an abnormality in the other terminals without an abnormality, thereby improving the reliability of the entire system.

In addition, all the terminals are simultaneously switched from the control using artificial intelligence (machine learning) to the PID control, thereby improving the stability of the overall system.

Ninth Embodiment

In the present embodiment, each of a plurality of terminals includes: a control means using artificial intelligence (machine learning); a control means using PID control different from the artificial intelligence; and a control switching means that, when an abnormality occurs in the control means using artificial intelligence (machine learning) in at least one of the plurality of terminals, switches the control in the terminal without an abnormality from the control means using artificial intelligence (machine learning) to the PID control.

In particular, the present embodiment is implemented from a server and a plurality of terminals, and includes a means for transmitting a signal from the server to the plurality of terminals in a specific period, and each of the terminals has a control switching means for, when the specific period signal is not received from the server, switching the control of the terminals without an abnormality among the plurality of terminals from the first control means to the second control means.

Figure 22:
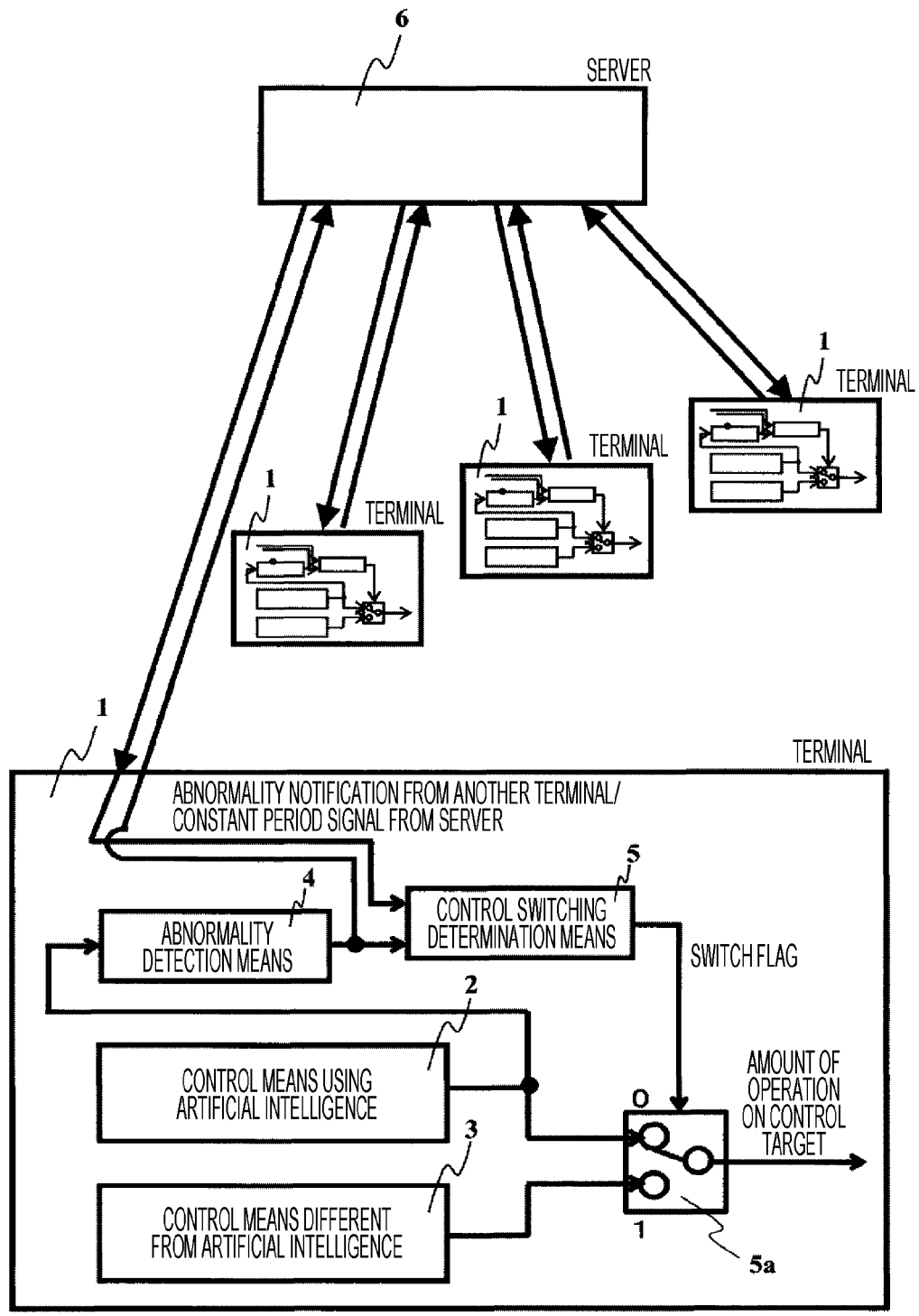
FIG. 22 is an overall view of a control system according to the ninth embodiment.

Referring to FIG. 22, a signal having a constant period is transmitted from the server 6 to the terminals 1. In other words, the output circuit 28 (transmission unit) of the server 6 transmits a period signal indicating a periodic signal to all the terminals 1. The other aspects are the same as in the first embodiment and therefore will not be described in detail.

Figure 23:
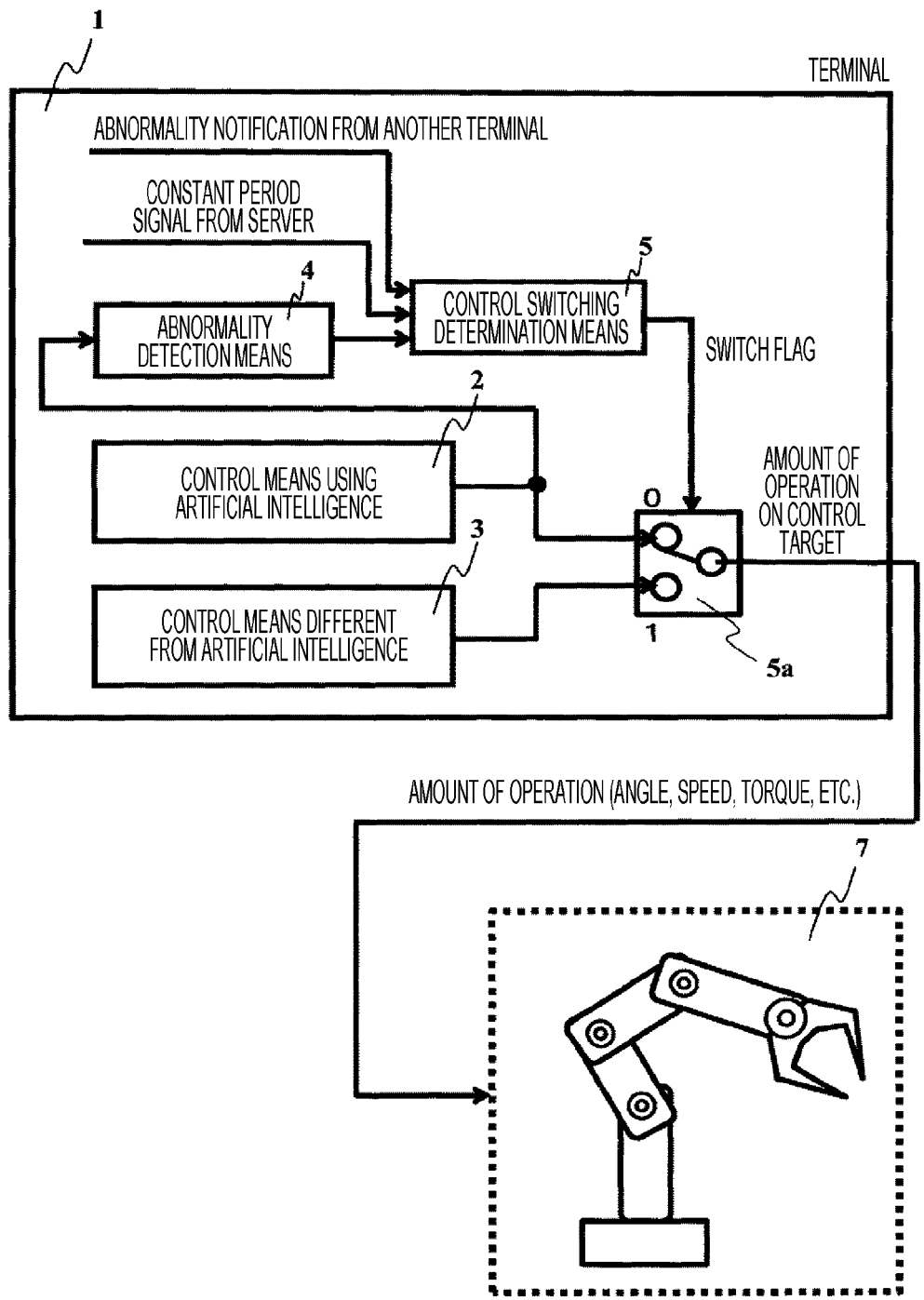
FIG. 23 is a diagram illustrating a terminal (control device) and a control target according to the ninth embodiment.

FIG. 23 illustrates a robot 7 in a production line controlled by the terminal 1 and the server 6. A control switching determination means 5 calculates a switch flag for switching of controls based on an abnormality notification from another terminal and a constant period signal from the server. Thereby, for example, when the server 6 breaks down or when a failure occurs in the communication path between the server 6 and the terminal 1, it is possible to switch from the control using artificial intelligence to the control different from artificial intelligence. The other aspects are the same as in the first embodiment and therefore will not be described in detail.

Figure 24:
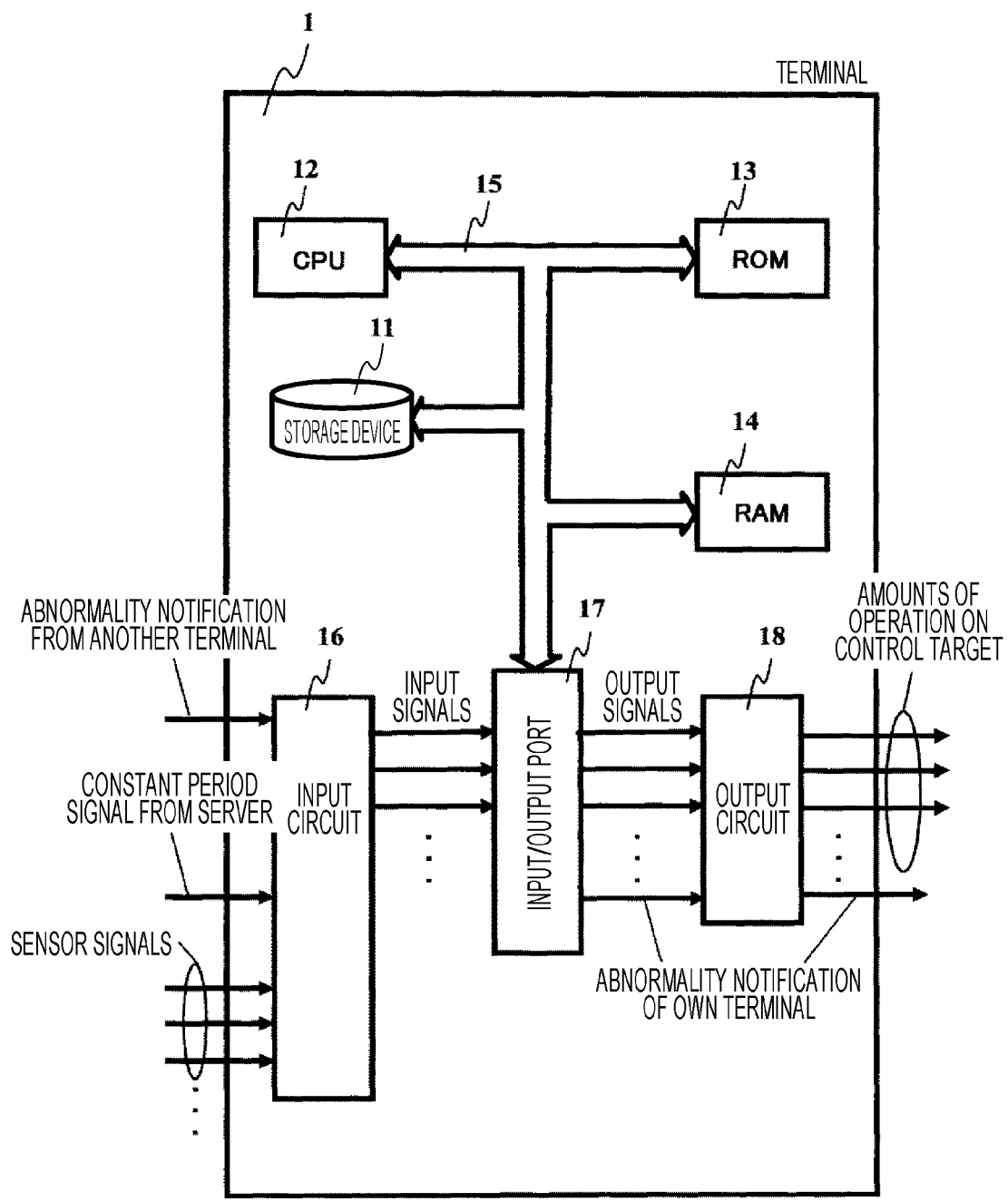
FIG. 24 is a system configuration diagram of a terminal (control device) according to the ninth embodiment.

FIG. 24 is a system configuration diagram of the terminal 1. As a signal input to the input circuit 16, a constant period signal from the server is added. The other aspects are the same as in the first embodiment and therefore will not be described in detail.

Figure 25:
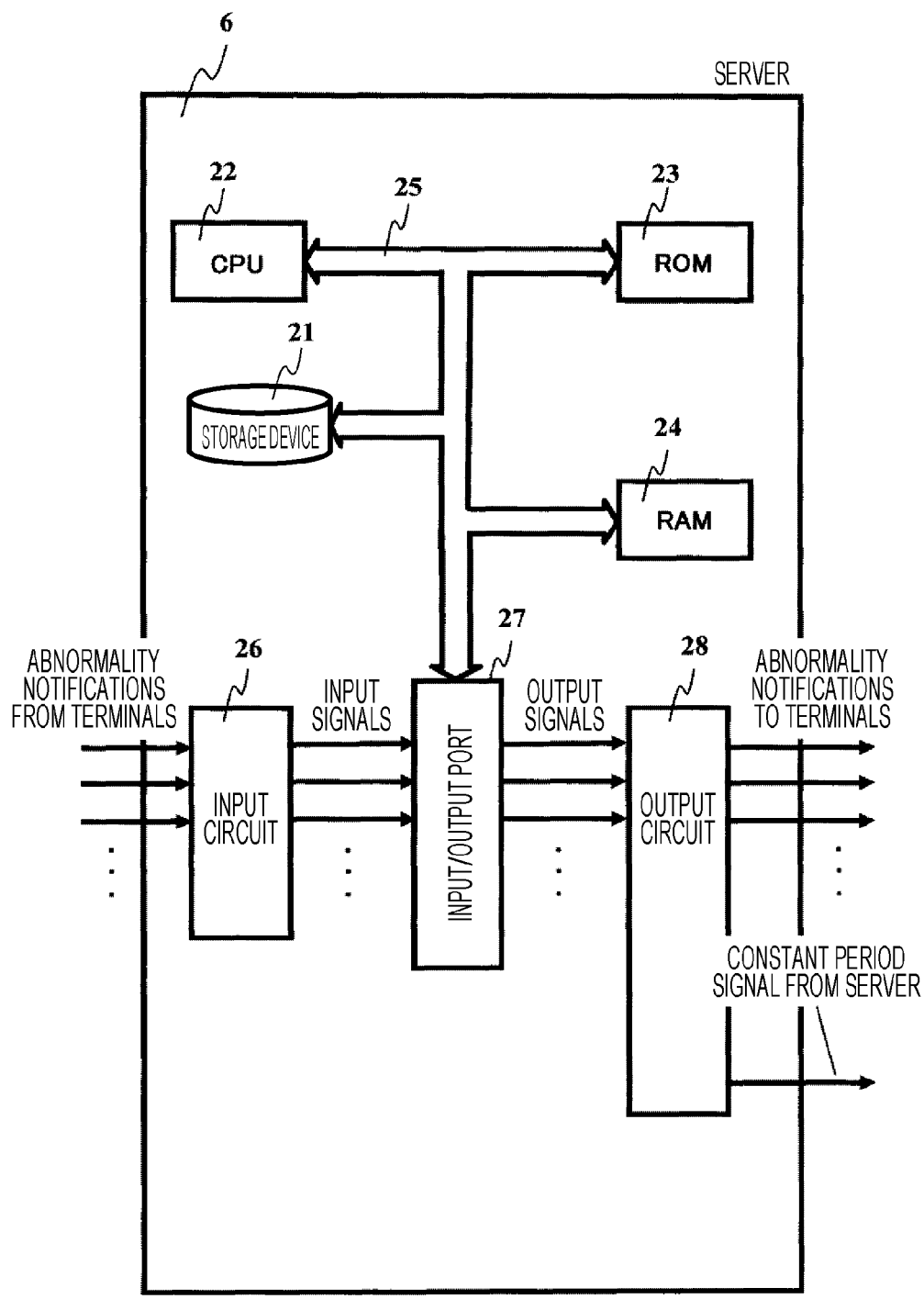
FIG. 25 is a system configuration diagram of a server according to the ninth embodiment.

FIG. 25 is a system configuration diagram of the server 6. As a signal output from the output circuit 28, a constant period signal from the server is added. The other aspects are the same as in the first embodiment and therefore will not be described in detail. The details of each of the processes will be described below.

<Control Means Using Artificial Intelligence (FIG. 5)>

In this process, the amount of an operation to be performed on a control target by a control using artificial intelligence (machine learning) is calculated. FIG. 5 specifically illustrates the process that is the same as the first embodiment and therefore will not be described in detail.

<Control Means Different from Artificial Intelligence (FIG. 6)>

In this process, the amount of an operation to be performed on a control target by a PID control as a control different from artificial intelligence is calculated. FIG. 6 specifically illustrates the process that is the same as the first embodiment and therefore will not be described in detail.

<Abnormality Detection Means (FIG. 7)>

In this process, an abnormality in the control using artificial intelligence (machine learning) is detected. FIG. 7 specifically illustrates the process that is the same as the first embodiment and therefore will not be described in detail.

<Control Switching Determination Means (FIG. 26)>

In this process, control switching determination is performed. FIG. 26 specifically illustrates the process.

A switch flag is turned on (=1) when "'there is an abnormality notification from another terminal' or 'there is an abnormality notification of the own terminal' or 'no signal is received from the server in a constant period' and 'a condition A is satisfied' and 'a condition B is satisfied'".

The conditions A and B are predetermined switching conditions in the terminal, and, for example, the following conditions can be considered.

Condition A: The control parameter value is in a predetermined range.

Condition B: The change amount of the control parameter value is in a predetermined range.

Thereby, when the control parameter of the terminal is stable, switching of control is permitted.

<Process by the Server (FIG. 27)>

In this process, the server notifies an abnormality in a terminal to the other terminals. FIG. 27 specifically illustrates the process.

When there is an abnormality notification from at least one terminal, the abnormality notification is provided to the other terminals.

The server transmits a signal to the terminals in a constant period.

As described above, according to the configuration described in the present embodiment, when an abnormality occurs in one of the terminals 1 that control the plurality of robots in the production line, the abnormality is notified to the other terminals via the server 6. Even in the terminals without an abnormality, switching takes place from the control means using artificial intelligence (machine learning) to the PID control, in the order in which the predetermined switching condition is satisfied. This makes it possible to prevent the occurrence of an abnormality in the other terminals without an abnormality, thereby improving the reliability of the entire system.

In addition, when no period signal from the server 6 is received, switching takes place from the control means using artificial intelligence (machine learning) to the PID control. This makes it possible to prepare for a case in which some abnormality occurs in the server 6 and no abnormality signal of the terminal 1 cannot be received via the server 6, thereby achieving improvement in the reliability of the system.

The present invention is not limited to the foregoing embodiments but includes various modification examples. For example, the foregoing embodiments have been described in detail so far for ease of comprehension of the present invention. However, the present invention is not limited to the embodiments including all the components described above. In addition, some of components of an embodiment can be replaced with components of another embodiment, and components of an embodiment can be added to components of another embodiment. Some of components in the foregoing embodiments may be added, deleted, or replaced by other components.

As a specific example of detection of occurrence of abnormality in another terminal, either detection of a break in normality or reception of an abnormality notification may be used.

In the foregoing embodiments 1 to 7 and 9, it is necessary that "condition A is satisfied" and "condition B is satisfied" in order to switch from the control using artificial intelligence to the control different from artificial intelligence. Alternatively, in a simpler manner, when no abnormality notification is received, the control switching unit (the switching determination means 5, the switch 5*a*) may cause the control means 2 (the first control unit) to perform the control using artificial intelligence, and when an abnormality notification is received, the control switching unit (the switching determination means 5, the switch 5*a*) may cause the control means 3 (the second control unit) to perform the control different from artificial intelligence.

In addition, when no abnormality notification is received and it is not determined that the own control means 2 (the first control unit) is abnormal, the control switching unit may cause the control means 2 (the first control unit) to perform the control using artificial intelligence, and when an abnormality notification is received or it is determined that the own control means 2 is abnormal, the control switching unit may cause the control means 3 (the second control unit) to perform the control different from artificial intelligence.

In the foregoing embodiments, the target of the control using artificial intelligence and the control different from artificial intelligence is the robot 7, the autonomous vehicle 8, or the drone 9 (flying object). However, the target of the control may be an arbitrary machine.

In the foregoing embodiment 9, it is necessary that "condition A is satisfied" and "condition B is satisfied" in order to switch from the control using artificial intelligence to the control different from artificial intelligence. In addition, when no period signal is received by the input circuit 16 (the reception unit), the control switching unit (the switching determination means 5, the switch 5a) may switch from the control using artificial intelligence to the control different from artificial intelligence.

In the foregoing embodiments, the control different from artificial intelligence is PID control or manual control as an example. Alternatively, the control different from artificial intelligence may be sliding mode control, adaptive control, or the like.

Some or all of the foregoing components and functions (means) may be implemented hardware-wise by designing an integrated circuit, for example. The foregoing components and functions (means) may be implemented software-wise by a processor (CPU) interpreting and executing the programs for performing these functions (means) and others. The information in the programs, tables, and files for performing the functions (means) may be stored in recording devices such as memories, hard discs, solid state drives (SSDs), or recording media such as IC cards, SD cards, and DVDs.

Embodiments of the present invention may be configured as follows:

(1) A control system including at least a plurality of terminals, wherein each of the plurality of terminals includes: a first control means using artificial intelligence of the same specification that performs learning by updating all parameters related to control; a second control means different from the artificial intelligence; and a control switching means that, when an abnormality is detected in the first control means in at least one terminal among the plurality of terminals, switches the control of the terminals in which no abnormality is detected among the plurality of terminals from the first control means to the second control means.

(2) The control system according to (1), wherein the first control means is control using machine learning.

(3) The control system according to (1), wherein the second control means is PID control.

(4) The control system according to (1), wherein the second control means is manual control.

(5) The control system according to (1), wherein when a state in which the value of at least one parameter of the first control means is not within a predetermined range lasts for a predetermined time, it is determined that there is an abnormality.

(6) The control system according to (1), wherein the parameter value of the first control means is updated by a learning process or the like during execution of the second control means.

(7) The control system according to (1), wherein, after updating the parameter value of the first control means, switching takes place from the second control means to the first control means.

(8) The control system according to (1), wherein the control system is formed from a server and terminals, and when an abnormality is detected in the first control means in at least one terminal among the plurality of terminals, the abnormality in the first control means is notified to the terminals without an abnormality among the plurality of terminals by a communication means via the server.

(9) The control system according to (1), wherein, when an abnormality is detected in the first control means in at least one terminal among the plurality of terminals, the abnormality in the first control means is notified to the terminals without an abnormality among the plurality of terminals by a communication means between the terminals.

(10) The control system according to (1), wherein, when an abnormality is detected in the first control means in at least one terminal among the plurality of terminals, switching takes place in the order in which a predetermined switching condition is satisfied from the first control means to the second control means in the terminals without an abnormality, among the plurality of terminals.

(11) The control system according to (1), wherein, when an abnormality is detected in the first control means in at least one terminal among the plurality of terminals, information on synchronization of switching timing is transmitted to all the terminals such that the control of the terminals in which no abnormality is detected among the plurality of terminals is switched from the first control means to the second control means at the same time.

(12) The control system according to (1), wherein the control system is a device that controls a robot.

(13) The control system according to (1), wherein the control system is a device that controls an autonomous vehicle.

(14) The control system according to (1), wherein the control system is a device that controls a flying object such as a drone.

(15) The control system according to (1), wherein the control system is formed from a server and a plurality of terminals, and includes a means for transmitting a signal from the server to the plurality of terminals in a specific period, each of the terminals has a control switching means for, when the specific period signal is not received from the server, switching the control of the terminals without an abnormality among the plurality of terminals from the first control means to the second control means.

According to (1) to (15), when an abnormality occurs in one of a plurality of terminals in a control systems using artificial intelligence, the other terminals without an abnormality are also switched to control not using artificial intelligence. Therefore, it is possible to prevent the occurrence of abnormalities in the other terminals without an abnormality, thereby achieving improvement in the reliability of the entire system.

REFERENCE SIGNS LIST

1 terminal
2 control means using artificial intelligence
3 control means different from artificial intelligence
4 abnormality detection means
5 control switching determination means
5a switch
6 server
7 robot
8 autonomous vehicle
9 drone
11 terminal storage device
12 terminal CPU
13 terminal ROM
14 terminal RAM
15 terminal data bus
16 terminal input circuit
17 terminal input/output port
18 terminal output circuit
21 server storage
22 server CPU
23 server ROM
24 server RAM
25 server data bus
26 server input circuit 27 server input/output port
28 server output circuit
101 example of processing by server (abnormality notification to terminals)
102 example of processing by server (parameter learning in machine learning)
103 example of processing by server (processing after parameter learning in machine learning)
104 example of processing by server (switching synchronization among terminals)
105 example of processing by server (periodic signal transmission to terminals)
121 example of control means using artificial intelligence (control using machine learning)
122 example of control means different from artificial intelligence (PID control)
123 example of control means different from artificial intelligence (manual control)

The invention claimed is:

1. A control device comprising:
a plurality of terminals, each of the plurality of terminals including
a first control algorithm that performs control using machine learning;
a second control algorithm that performs a different control, which is different from the machine learning; and
a control switch that,
during control execution using the first control algorithm on any of the plurality of terminals,
when an abnormality occurs during the control execution
controlling, via the control switch, a terminal of the plurality of terminals where the abnormality occurred,
while switching from the first control algorithm to the second control algorithm in the terminal where the abnormality occurred,
controlling any other terminals of the plurality of terminals where the abnormality has not occurred, and
switching in the any other terminals from the first control algorithm to the second control algorithm.

2. The control device according to claim 1, wherein the plurality of terminals further comprise
an input/output device that receives an abnormality notification indicating an abnormality in the other terminal, wherein
the control switch is configured to, when the abnormality notification is not received, cause the first control algorithm to perform the control using the machine learning, and when the abnormality notification is received, cause the second control algorithm to perform the different control.

3. The control device according to claim 2, wherein
the first control algorithm
learns control parameter values indicating parameters of a function for determining an output value of the control using the machine learning from an input value of the control using the machine learning, and
calculates the output value based on the input value and the learned control parameter values.

4. The control device according to claim 1, wherein
the different control is PID control or manual control.

5. The control device according to claim 3, wherein the plurality of terminals further comprise a third control algorithm that, when a state in which at least one of the control parameter values is not within a predetermined range lasts for a predetermined time, determines that the first control algorithm is abnormal, wherein
the control switch is configured to,
when the abnormality notification is not received and it is not determined that the first control algorithm is abnormal, cause the first control algorithm to perform the control using the machine learning, and
when the abnormality notification is received or it is determined that the first control algorithm is abnormal, cause the second control algorithm to perform the different control.

6. The control device according to claim 3, wherein the plurality of terminals further comprise
a memory that stores the control parameter values learned by the first control algorithm, wherein
the input/output device receives the control parameter values learned by the server, and
the first control algorithm updates the control parameter values stored in the memory to the control parameter values learned by the server in a period during which the second control algorithm performs different control.

7. The control device according to claim 6, wherein
the control switch switches from the different control to the control using the machine learning after the updating of the control parameter values.

8. The control device according to claim 5, wherein the plurality of terminals further comprise the input/output device that, when it is determined that the first control algorithm is abnormal, transmits the abnormality notification.

9. The control device according to claim 1, wherein
a target of the control using the machine learning and the different control is a machine.

10. The control device according to claim 9, wherein
the machine is a robot, an autonomous vehicle, or a flying object.

11. A control system comprising the control device according to claim 8 and a server, wherein
the abnormality notification is provided via the server to the plurality of terminals in which it is not determined that the first processor is abnormal.

12. A control system including the control device according to claim 8, wherein
the abnormality notification is provided through inter-terminal communication to the plurality of terminals in which it is not determined that the first control algorithm is abnormal.

13. The control system according to claim 11, wherein
the server transmits to each of the plurality of terminals a switching synchronization flag for synchronizing a timing for switching from the control using the machine learning to the different control,
the input/output device of each of the plurality of terminals receives the switching synchronization flag, and
the control switch of each of the plurality of terminals is configured to, when the abnormality notification is received and the switching synchronization flag is received, switch from the control using the machine learning-to the different control.

14. The control system according to claim 11, wherein
the server transmits to each of the plurality of terminals a period signal indicating a periodic signal,
the input/output device of each of the plurality of terminals receives the period signal, and the control switch of each of the plurality of terminals is configured to, even when the period signal is not received, switch from the control using the machine learning to the different control.

\* \* \* \* \*